United States Patent
Knuesel et al.

(10) Patent No.: US 12,547,947 B2
(45) Date of Patent: Feb. 10, 2026

(54) SYSTEM AND METHOD FOR EMPLOYING MULTIPLE MODELS FOR FEDERATED MACHINE LEARNING

(71) Applicant: SAP SE, Walldorf (DE)

(72) Inventors: Philipp Knuesel, Nussloch (DE); Andre Sres, Winnweiler (DE); Mirko Hin, Mannheim (DE); Roman Rommel, Neustadt an der Weinstrasse (DE); Janick Frasch, Heidelberg (DE); Santo Bianchino, Romerberg (DE); Dominik Heere, Heidelberg (DE)

(73) Assignee: SAP SE, Walldorf (DE)

( * ) Notice: Subject to any disclaimer, the term of this patent is extended or adjusted under 35 U.S.C. 154(b) by 892 days.

(21) Appl. No.: 17/835,506

(22) Filed: Jun. 8, 2022

(65) Prior Publication Data
US 2022/0405651 A1 Dec. 22, 2022

(30) Foreign Application Priority Data
Jun. 22, 2021 (EP) ..................................... 21180907

(51) Int. Cl.
*G06N 20/20* (2019.01)
*H04L 67/10* (2022.01)

(52) U.S. Cl.
CPC .............. *G06N 20/20* (2019.01); *H04L 67/10* (2013.01)

(58) Field of Classification Search
None
See application file for complete search history.

(56) References Cited

U.S. PATENT DOCUMENTS

2023/0343147 A1\* 10/2023 Vasudevan ............. G06Q 50/40

OTHER PUBLICATIONS

Pezoulas et al., Overcoming the Barriers That Obscure the Inter-linking and Analysis of Clinical Data Through Harmonization and Incremental Learning, IEEE Open Journal of Engineering in Medicine and Biology, vol. 1; 2020; pp. 83-90 (Year: 2020).\*
Sim et al., Ontology-Based Federated Data Access to Human Studies Information, in AMIA Annual Symposium Proceedings (vol. 2012); pp. 856-865 (Year: 2012).\*
Sattler et al., Clustered Federated Learning: Model-Agnostic Distributed Multitask Optimization Under Privacy Constraints, IEEE Transactions on Neural Networks and Learning Systems, vol. 32, No. 8, Aug. 2021; pp. 3710 to 3722 (Year: 2021).\*
Nishio et al., Client Selection for Federated Learning with Heterogeneous Resources in Mobile Edge; arXiv:1804.08333v2 [cs.NI] Oct. 30, 2018; Total pp. 7 (Year: 2018).\*
Chen et al., Communication-efficient federated learning; PNAS 2021 vol. 118 No. 17 e2024789118; Published Apr. 22, 2021; pp. 1-8 (Year: 2021).\*
"Communication: Extended European Search Report", European Patent Office, Dec. 13, 2021 (Dec. 13, 2021), for European Application No. 21180907.4-1208, 10pgs.

(Continued)

*Primary Examiner* — Alan Chen
(74) *Attorney, Agent, or Firm* — Buckley, Maschoff & Talwalkar LLC

(57) ABSTRACT

Some embodiments are directed to a federated machine learning, including the inference and training. Inference may be done by applying multiple machine learning models to a mapped record. The mapped record may be obtained by applying a mapping rule to a local record. The mapping rule may generalize or extend data features in the local record.

17 Claims, 17 Drawing Sheets

(56) References Cited

OTHER PUBLICATIONS

Pu Liang, Paul et al., "Think Locally, Act Globally: Federated Learning with Local and Global Representations", ARXIV.org, Cornell University Library, 201 Olin Library Cornell University Ithaca, NY 14853, Jul. 14, 2020 (Jul. 14, 2020), XP081705109, 34pgs.

Gao, Dashan et al., "Privacy-preserving Heterogeneous Federated Transfer Learning", 2019 IEEE International Conference on Big Data (Big Data), IEEE, Dec. 9, 2019 (Dec. 9, 2019), XP033721161, DOI: 10.1109/BIGDATA47090.2019.9005992, [retrieved on Deb. 20, 2020], (pp. 2552-2559, 8 total pages).

* cited by examiner

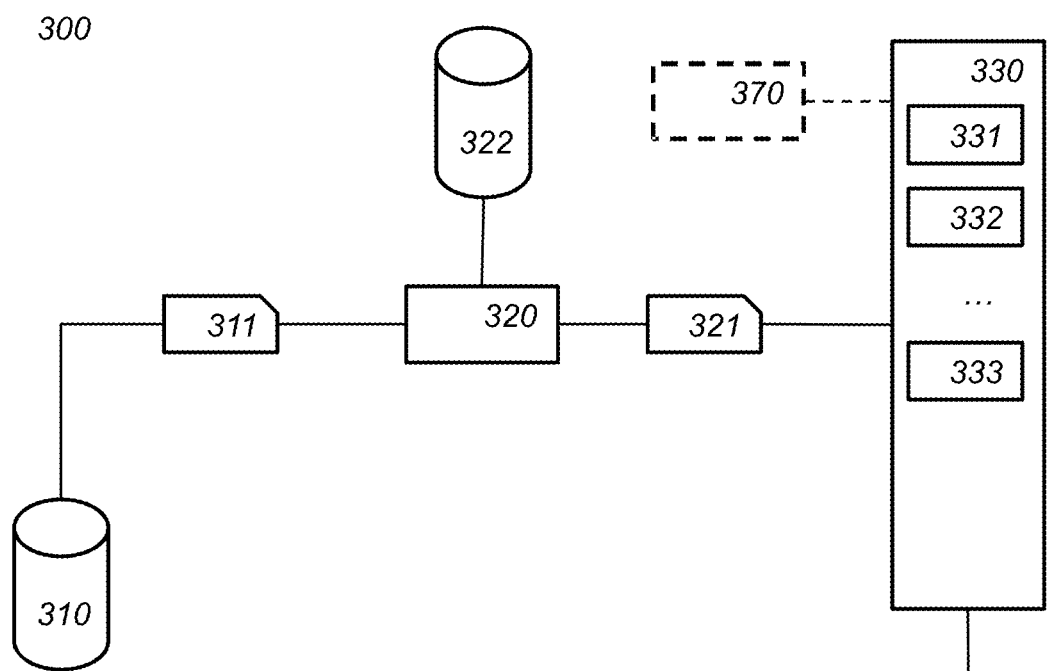
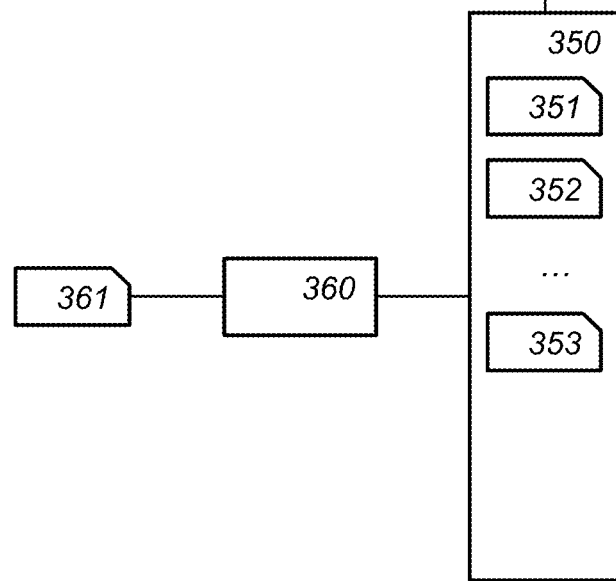
Fig. 3a

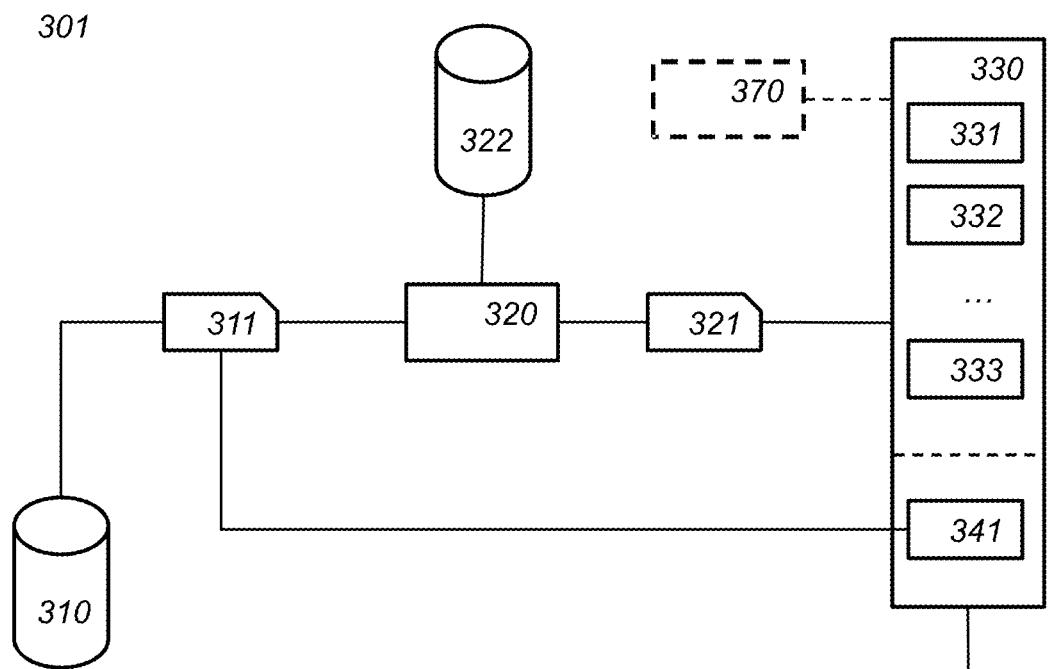
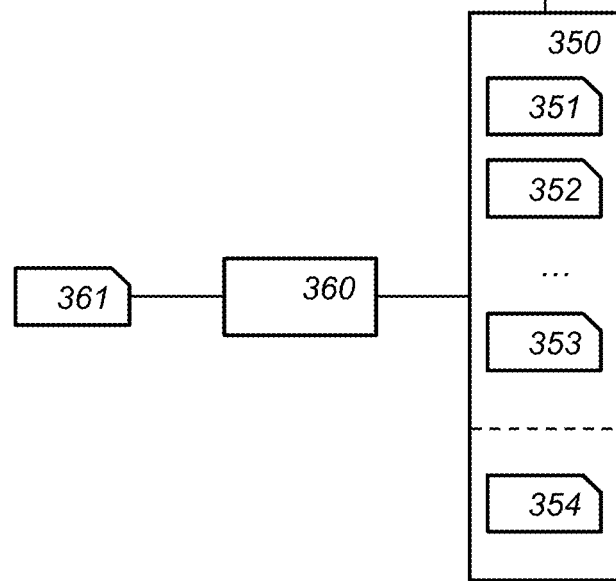
Fig. 4a

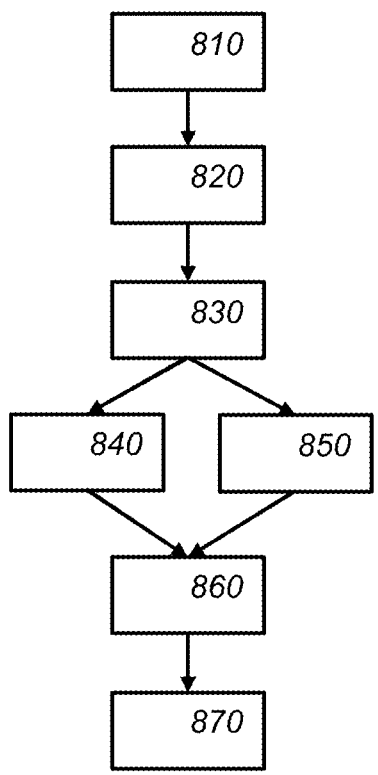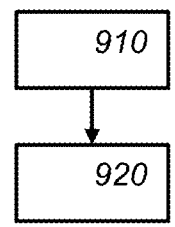
Fig. 8a                    Fig. 8b

SYSTEM AND METHOD FOR EMPLOYING MULTIPLE MODELS FOR FEDERATED MACHINE LEARNING

CROSS-REFERENCE TO RELATED APPLICATIONS

The present application claims priority under 35 U.S.C. § 119(a) to European Patent Application No. 21180907.4, filed Jun. 22, 2021, the contents of which are incorporated herein by reference for all purposes.

TECHNICAL FIELD

The presently disclosed subject matter relates to a federated machine learning method, a federated machine learning distribution method, a federation client, a federation server, and a computer readable medium.

BACKGROUND

Machine learning (ML) plays an ever more important role in data-oriented businesses. Machine learning helps to uncover patterns that are present in the data and predict future events. Various machine learning algorithms have been brought to bear on a large variety of data. For example, in machine learning algorithms can predict the expected delivery time of an article, or the expected payment date. Other applications include predictive maintenance and medical diagnosis.

Unfortunately, an important drawback of machine learning is its reliance on large amounts of data. Moreover, the data should represent all aspects of the problem for which the machine model is trained. It turns out that for many potential applications one or both of these issues occur. For example, one may want to use machine learning but not have enough data, or the data that is available may not have a sufficient number of examples representing the full breadth of data that can be encountered in practice.

SUMMARY

It is desired to have technical solutions that address these and other problems in machine learning.

For example, one may receive one or more trained parameter sets representing one or more machine learning models, e.g., at a client. The received machine learning models may all have a common input format. They will typically also share a common output format.

The received multiple models may be applied to a local record from a local database inference. The local record may not be according to the input format; for example, the input format may expect data features that are not in the local format, or may expect data features in a different encoding. A mapping rule may be applied to a data feature of the local record to obtain a mapped record according to the input format. The mapping rule may be configured to generalize a data feature by mapping a first range of the data feature to a second reduced range, and/or to extend the number of data features by mapping a data feature to multiple extended features.

The received machine learning models may be applied to the mapped record. A locally trained model may also be applied, to the mapped record, to the local record or to a record specially mapped for the locally trained model. In this way, some locally available information, e.g., sensitive information, may be used in a local model, but not in the received models. The model results of the applied models may be combined to a combined model result using a combination algorithm, say, averaging, majority voting, and the like. The mapping done in inference may also be used when training models. Each training client trains autonomously on its own local data independent from the other clients or the server. No client needs to share its local data. Advantageously, locally trained models are shared with a federation server, e.g., for distribution to other clients, possibly concatenated or aggregated.

In an embodiment, combining gives different weights to different models. For example, a locally trained model may be given a higher weight at that client, while the same model may be given a lower weight at another client. Weighting factors may also depend on the quality of the model, e.g., the size of its training data.

Interestingly, it is not needed to share the actual training data with other clients or with said server. This is an advantage since it reduces network traffic and addresses privacy concerns.

A mapping rule may use an ontology. For example, a species may be mapped to a genus according to an ontology. For example, a data feature may be extended according to an ontology. For example, a data features may be associated with a leaf of the ontology, while the hierarchical higher levels of the ontology indicate extended features. Extended features may be computed from two or more existing features; for example, a distance between two locations may be added as an extended feature. For example, data may be retrieved for a feature and added to the record. For example, given a discrete data feature one or more continuous values may be retrieved, in particular descriptive values. These values are more generalizable. For example, given a discrete ID, such as a material ID, continuous variables may be added, such as material weight, price per piece and material volume.

Advantageously, the one or more machine learning models are applied on a device that also runs the local database.

In an embodiment, a first federation client is assigned to a cluster of other federation clients, which is a subset of all clients. The first federation client receives models from clients in its cluster, but not from other clients. At least two clients are assigned to different clusters. Using clusters has several advantages. For example, quality of the federated model may be increased by including in the cluster only clients with similar data. For example, network traffic can be reduced since not all clients are included in a cluster, especially if the federated model is an ensemble model.

The federation client and federation server are electronic devices. For example, they may comprise a computer.

Aspects include a method for inference and a method for training a federated model. The federation learning methods for inference and/or training described herein may be applied in a wide range of practical applications. Such practical applications include prediction of transport time of goods, predictive maintenance, medical diagnosis, image classification, and so on. An embodiment of the methods may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of local machine learning, FIG. 1b schematically shows an example of an embodiment of federated learning, FIG. 2a schematically shows an example of an embodiment of a federation client, FIG. 2b schematically shows an example of an embodiment of a federation server, FIG. 2c schematically shows an example of an embodiment of a federation client, FIG. 2d schematically shows an example of an embodiment of a federation server, FIG. 2e schematically shows an example of an embodiment of a federation client-server system, FIG. 3a schematically shows an example of an embodiment of a federation client, FIG. 3b schematically shows an example of an embodiment of a federation client, FIG. 4a schematically shows an example of an embodiment of a federation client, FIG. 4b schematically shows an example of an embodiment of a federation client, FIG. 5a schematically shows an example of an embodiment of a federation server, FIG. 5b schematically shows an example of an embodiment of a federation server, FIG. 6a schematically shows an example of an embodiment of a mapping rule, FIG. 6b schematically shows an example of an embodiment of a mapping rule, FIG. 6c schematically shows an example of an embodiment of a mapping rule, FIG. 6d schematically shows an example of an embodiment of a local record and a mapped record, FIG. 7a schematically shows an example of an embodiment of a federation client-server system, FIG. 7b schematically shows an example of a sequence diagram related to an embodiment of a federation client-server system, FIG. 7c schematically shows an example of a sequence diagram related to an embodiment of a federation client-server system, FIG. 7d schematically shows an example of a sequence diagram related to an embodiment of a federation client-server system, FIG. 7e schematically shows an example of an embodiment of a federation client-server system, FIG. 8a schematically shows an example of a flow chart related to an embodiment of a machine learning method, FIG. 8b schematically shows an example of a flow chart related to an embodiment of a federated machine learning distribution method, FIG. 9a schematically shows a computer readable medium having a writable part comprising a computer program according to an embodiment, FIG. 9b schematically shows a representation of a processor system according to an embodiment.

REFERENCE SIGNS LIST

Figure 1A:
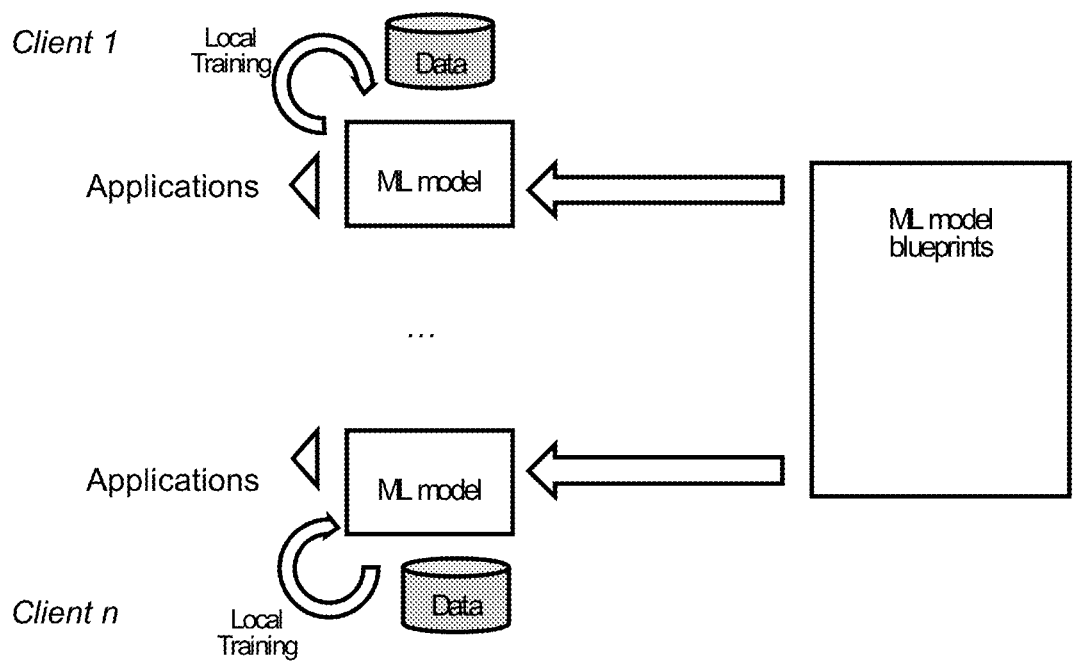

The following list of references and abbreviations corresponds to FIGS. 2-6d, 9a, 9b, and is provided for facilitating the interpretation of the drawings and shall not be construed as limiting the claims.

200 a federation client-server system
210 a federation client
210.1-210.3 a federation client
230 a processor system
240 a memory
250 a communication interface
231 an inference unit
232 a mapping unit 232
233 a combining unit
234 a training unit
255 a computer network
260, 260.1 a federation server
270 a processor system
280 a memory
290 a communication interface
271 scheduling unit
272 compression unit
273 aggregation unit
300, 301 a federation client
310 a local database
311 a local record
320 a mapping unit
321 a mapped record
322 a mapping rule base
330 multiple trained parameter sets
331-333 a trained parameter set
341 a locally trained parameter set
350 multiple model results
351-353 a model result
354 a further model result
360 a combining unit
361 a combined model result
370 a federation server
400,401 a federation client
410 a local database
420 multiple local training records
421-423 a local training record
430 a training unit
431 a further training unit
441 a locally trained parameter set
442 a further locally trained parameter set
500,501 a federation server
520 a machine learning model repository
530 a scheduling unit
531 scheduling information
525 an aggregating unit
600 an ontology
610, 620, 630 a level
611-613 elements on a first level
621-623 elements on a second level
631-633 elements on a third level
640, 650 a genus 641-643 a species
651-653 a species
660 a feature
661-663 further features
670 a local record
671-673 a data feature
680 a mapped record
681.1-684 a mapped data feature
1000, 1001 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

FIG. 1a schematically shows an example of local machine learning.

The example shown in FIG. 1a does not use federated learning, and does not use a mapping rule. Machine learning is an approach that leverages algorithms to extract rules from data that in turn help to facilitate and automate business processes. As such, it is often dependent on large amounts of data to be employed successfully in a real-world business setting.

Shown on the left are a number of machine learning clients, numbered from 1 to n. Each client has access to local data. The local data is used to train a machine learning model (ML model). The training is local training. The clients are independent from each other.

Conventionally, if it were desired to train on a larger collection of data, then, one would bring together all relevant data at one place and train a machine learning model centrally. In the enterprise domain, this would imply to replicate data of multiple client tenants to a central storage. Such a replication is often problematic, if only for reasons of data lifecycle management. In fact, due to data privacy concerns and regulations, it may even be prohibited to store this data centrally.

The clients may receive limited support in the form of ML model blueprints, e.g., machine learning models which are shipped as empty shells that clients need to train first, based on their own data. An ML model blueprint repository is shown on the right. For example, a server may send an untrained model, or an untrained model template to a client to help it select a correct model for its data.

Sending an untrained model, may be direct, e.g., by having the server sending the model to the client via computer network, e.g., an Internet connection. Sending an untrained model, may be less direct, e.g., by if the client obtains the model from the server as part of installing an update, a service patch, etc., wherein multiple software updates may have been bundled. The update may come a computer network, but also, say, via memory card or CD/DVD.

This approach of training on a client site may even be problematic in some cases, e.g., a new client may not yet have a data history in its system. Such a data collection may take months or even years to collect. Smaller clients may have too few data on their own. The lack of sufficient amounts of local training may render certain use cases infeasible, particularly for smaller clients.

Figure 1B:
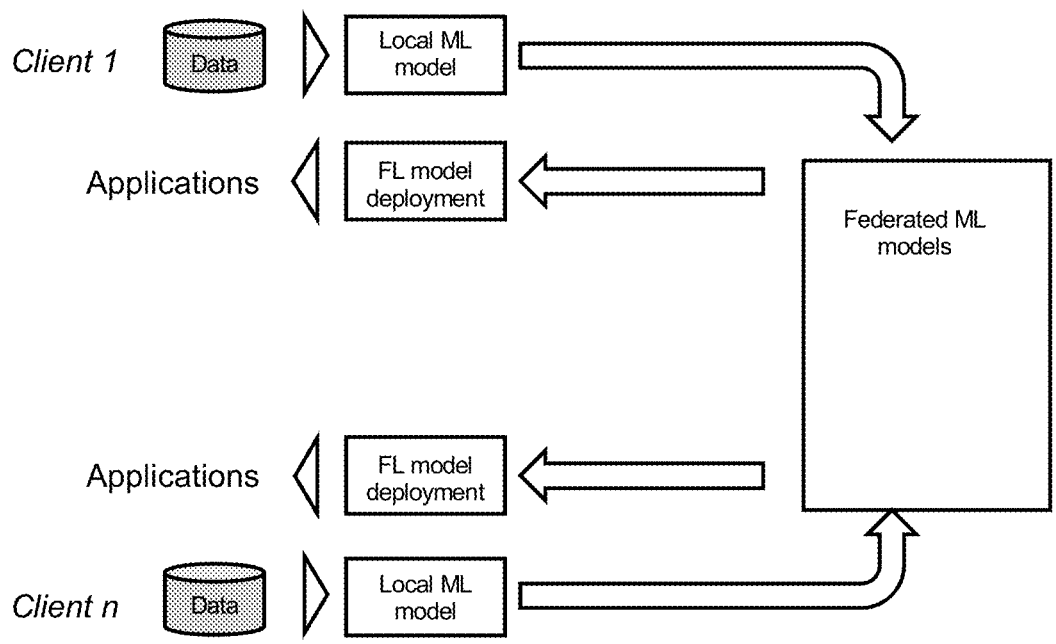

FIG. 1b schematically shows an example of an embodiment of federated learning.

Using federated learning a client may train a model by collaborating with other clients, coordinated by a central Federated Learning server. Following this approach, models are trained locally at each client on its own local dataset. However, the trained models are sent back to a federated machine learning model repository—shown in FIG. 1b on the right. At the federated ML model repository the models are collected and distributed towards the clients. A federated model could be in the form of an ensemble model, e.g., multiple models each trained at a client. A federated model may be or may comprise an aggregated model, in which two or more models are aggregated.

This has the advantage that the aggregated model is trained over the combination of all data of all participating clients, but without having to collect all data at a central location. Only statistical information concerning the learned model updates are shared across the clients companies for constructing a federated model of improved model performance, that is subsequently distributed back to all parties.

Since the data stays at each involved party, federated learning improves privacy preserving machine learning—especially when combined with additional security and data privacy mechanisms.

In an embodiment, an ensemble model packages the trained models, which may then be sent to the client. In an embodiment, a federated model is computed from two or more of the received trained models, e.g., using an ML algorithm, or other kinds of algorithms, in which case the meta model, that is the federated model may be distributed.

For federated learning, the data at the multiple clients should ideally represent a similar relationship between input and output variables. Under this condition, having more federation members is like having more data. Having more training data usually improves model performance until convergence. However, this ideal is often difficult to realize in practice. Although clients typically have somewhat similar data, e.g., because being face with similar prediction needs, the local data is dissimilar having different formats and/or encodings. One way to address this problem is to apply a mapping rule before applying a model, to map local data to a form that is better suited for federated learning. Various aspects of such mapping rules are illustrated herein.

Federated learning can reduce training data need for individual clients to lower entry barriers and increase ML adoption. Moreover, by training on more and/or more diverse data, a model is obtained that better reflects the patterns in the larger data pool and/or more diverse data pool. Moreover, through federated learning a client may receive model improvements, even if it has not itself done further training on its own local model. A federated learning server is preferably used to manage the federation, e.g., by receiving trained models and distributing model updates from and to the participating clients.

For example, consider a situation in which a number of clients are already established with larger or smaller local datasets. A new client with no or little local data will not be able to use machine learning in its operations, as its local data size is too small. By joining a group of clients and training a federated model, the new client can quickly get a much more accurate model than it could on its own. As its data set grows the other clients likewise profit from increased data and/or increased data diversity. Should at some point the local data size become large enough, the client could opt to train a local model on local data in addition to the federated model, or even instead thereof.

Figure 2A:
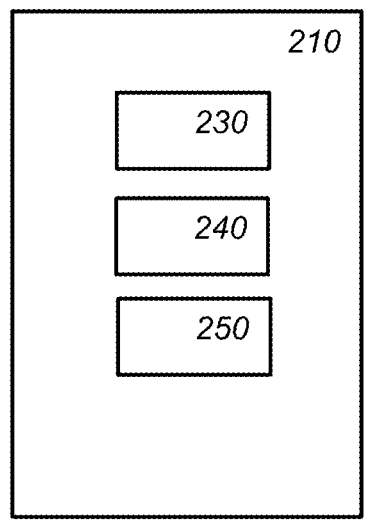

FIG. 2a schematically shows an example of an embodiment of a federation client 210.

For example, the federation client 210 of FIG. 2a may be used to apply a trained federated machine learning model, in particular an ensemble model, and/or to train one or more local machine learning model, one of which may be for further distribution to other federation clients like client 210.

Figure 2C:
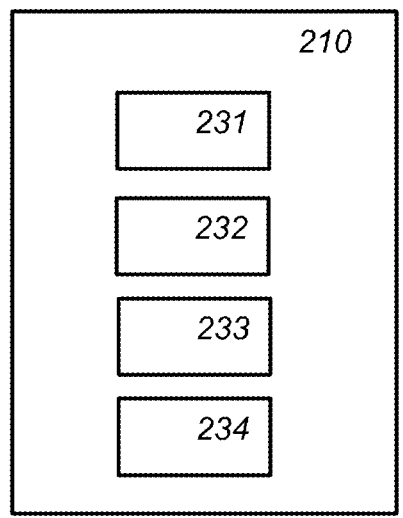
Figure 2B:
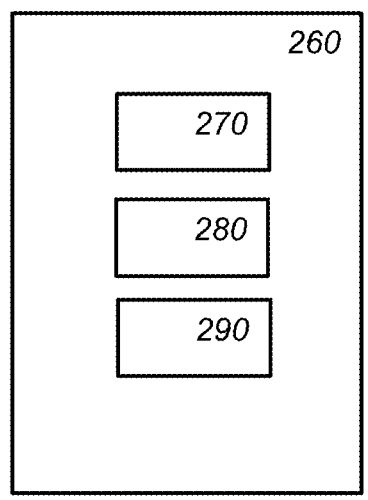

FIG. 2b schematically shows an example of an embodiment of a federation server 260.

For example, the federation server 260 of FIG. 2b may be used to manage the receiving and distribution of locally trained machine learning models, from and to multiple federation clients, such as federation client 210. Optionally, federation server 260 may aggregate two or more locally trained model in an aggregated model, e.g., by an aggregation algorithm, such as averaging multiple model or training a new model based on the local models.

Federation client 210 may comprise a processor system 230, a storage 240, and a communication interface 250. Federation server 260 may comprise a processor system 270, a storage 280, and a communication interface 290.

Storage 240 and/or 280 may comprise local storage, e.g., a local hard drive or electronic memory. Storage 240 and/or 280 may comprise non-local storage, e.g., cloud storage. In the latter case, storage 240 and/or 280 may comprise a storage interface to the non-local storage.

Federation client 210 and federation server 260 may communicate internally, with other systems, with each other, external storage, input devices, output devices, and/or one or more sensors over a computer network. The computer network may be an internet, an intranet, a LAN, a WLAN, etc. The computer network may be the Internet. The system comprises a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

In federation client 210, the communication interface 250 may be used to send or receive digital data. For example, federation client 210 may send locally trained models or model updates to federation server 260. For example, federation client 210 may receive locally trained models or model updates from federation server 260. For example, federation client 210 may receive model inputs for applying the federated model to.

In federation server 260, the communication interface 290 may be used to send or receive digital data. For example, federation server 260 may send locally trained models or model updates to federation clients, such as client 210. For example, federation server 260 may receive locally trained models or model updates from federation clients, such as client 210.

The execution of federation client 210 and federation server 260 may be implemented in a processor system, e.g., one or more processor circuits, e.g., microprocessors, examples of which are shown herein. The processor system may comprise one or more GPUs and/or CPUs. Federation client 210 and federation server 260 may comprise multiple processors, which may be distributed over different locations. For example, federation client 210 and/or federation server 260 may use cloud computing.

FIG. 2c schematically shows an example of an embodiment of a federation client 210.

FIG. 2c shows functional units that may be functional units of the processor system. For example, shown in FIG. 2c as units of federation client 210 is: an inference unit 231, a mapping unit 232, a combining unit 233, and a training unit 234.

For example, inference unit 231 may be configured to apply machine learning models to a record. The applied machine learning models may be locally trained or received from a federation server, such as server 260. In an embodiment, at least one of the applied machine learning models is received from the federation server and is applied to a mapped record.

For example, mapping unit 232 may be configured to apply a data mapping rule to obtain a mapped record from a local record. The mapping rule is further expanded upon herein; for example, it may a map data range to improve federated learning.

For example, combining unit 233 may be configured to combine multiple model results into a combined model result. For example, training unit 234 may be configured to train one or more local machine learning models on multiple local records. In an embodiment, at least one of the local machine learning models is trained on mapped records.

Inference unit 231 and training unit 234 are typically both present in a federation client, but this is not necessary. For example, once training is complete, training unit 234 may be discarded. For example, inference unit 231 could be loaded after training is complete. For example, a federation client could be configured for inference or training only.

Figure 2D:
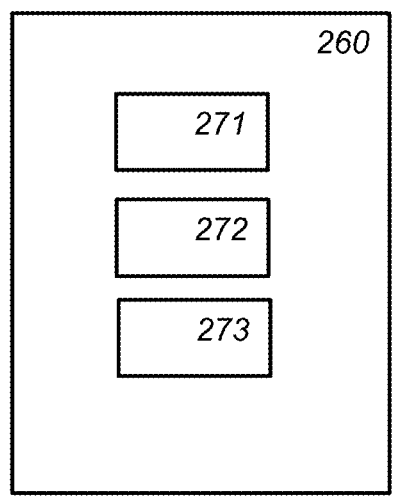

FIG. 2d schematically shows an example of an embodiment of a federation server 260.

FIG. 2d shows functional units that may be functional units of the processor system. For example, shown in FIG. 2d as units of federation server 260 is: a scheduling unit 271, a compression unit 272, and an aggregation unit 273.

For example, scheduling unit 271 may be configured to schedule the receiving and sending of locally trained models from multiple federation clients. For example, scheduling unit 271 may send a model request to a federation client. For example, scheduling unit 271 may receive a model update from a federation client. For example, scheduling unit 271 may manage a schedule to manage regular model updates. For example, compression unit 272 may be configured to compress model updates before sending or decompress model updates after receiving. For example, aggregation unit 273 may be configured to aggregate multiple locally trained models into a single model. The compression and aggregation units are optional Some of the figures, in particular FIGS. 2c and 2d may be used as a blueprint of a possible functional organization of the processor system. The processor circuit(s) are not shown separate from the units in these figures. For example, the functional units shown in FIGS. 2c and 2d may be wholly or partially implemented in computer instructions that are stored at federation client 210 or federation server 260, e.g., in a respective electronic memory, and are executable by a microprocessor of federation client 210 and/or system 260 In hybrid embodiments, functional units are implemented partially in hardware, e.g., as coprocessors, e.g., machine learning coprocessors, e.g., neural network coprocessors, and partially in software stored and executed on federation client 210 and/or server 260.

Figure 2E:
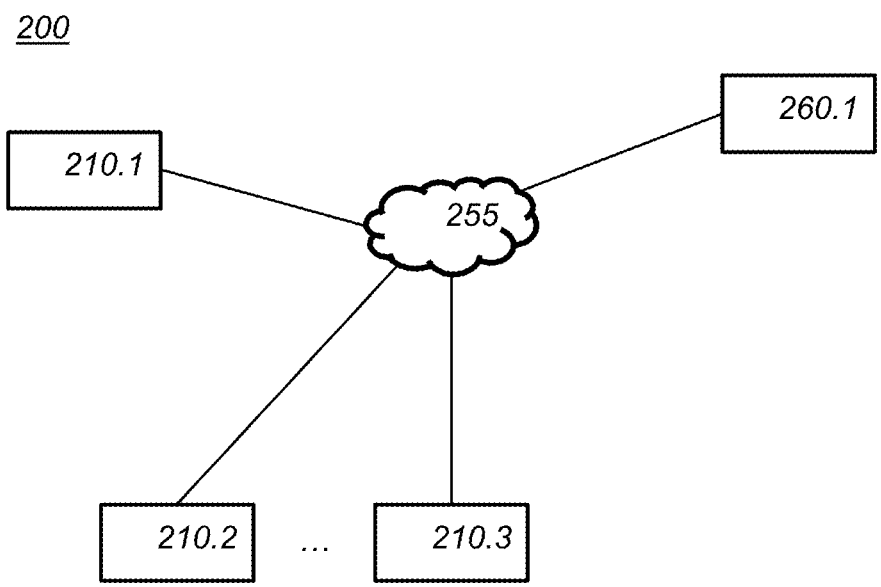

FIG. 2e schematically shows an example of an embodiment of a federation client-server system 200.

Federation client-server system 200 comprises multiple federation clients. Shown are three clients: federation client 210.1-210.3. There may be more than three federation clients or there may be only two federation clients. Shown is one federation server 260.1. There may be more than one federation server. The federation clients and federation server are interconnected through a computer network computer network 255, e.g., the internet, etc. In an embodiment, communication between clients runs through the server, although, clients could send trained models or model updates directly to another client. Sending through a server has the advantage that the server can centrally manage the models, e.g., manage the distribution schedule, e.g., to reduce network load. Moreover, a server may perform additional tasks such as aggregation and clustering.

FIG. 3a schematically shows an example of an embodiment of a federation client 300.

Federation client is configured to participate in a federated learning scheme, e.g., at least to run inference on local records using a federated trained model; client 300 may also be configured to participate in the training itself. The other participating clients may have a similar organization as client 300.

Federation client 300 has access to a local database 310. For example, local database 310 may comprise multiple records for which inference is to be made, e.g., a prediction. For example, a record may comprise information related to a product sale, and the prediction may be an expected date of arrival of the product, or an expected date of payment, or the like. In an embodiment, a record comprises sensor values, e.g., information obtained from one or more sensors, e.g., an image from a camera, a temperature from a temperature sensor and the like. Federation client 300 may comprise a database interface to access local database 310. For example, the local database 310 may be stored on local storage or cloud storage, etc.

One particular local record 311 of local database 310 is shown. Federation client 300 is configured for inference on local record 311, e.g., to predict a date of a future event. Local record 310 may be selected by a user of client 300, e.g., through a user interface of client 300. However, in an embodiment, inference is run automatically for multiple local records. For example, local records may be selected according to a predetermined selection rule. For example, new records may automatically receive a predicted delivery date or the like, which may in turn be used to automatically generate forecasts, or the like.

Record 311 comprises multiple data features according to a local format. The local format may be determined by the applications for which local database 310 was made. The particular format may be accidental. The local format may have been chosen at some time in the past, possibly without inference applications in mind. The inventors found that the particular format of records is often not optimal for machine learning in general or federated learning in particular. Moreover, the local formats often differ between clients; This is an impediment to federated learning.

Federation client has access to multiple trained parameter sets 330. In an embodiment, the multiple trained parameter sets 330 were received from a federation server 370. Shown are trained parameter sets 331, 332 and 333; there may be more or fewer than three trained parameter sets. Federation server 370 is shown in FIG. 300 with a dashed box, to indicate it is typically not part of the federation client. It is possible though, that one or more of the multiple participating clients could be configured both as a client and as a server.

The federation client is configured to apply the one or more machine learning models to the mapped record, as well as applying a locally trained machine learning model, thus obtaining multiple model results. For example, the locally trained machine learning model may be applied to the mapped record. As further explained herein, the locally trained machine learning model could be applied to a different model instead.

The parameter sets represent trained models. The particular set of parameters depend on the particular model that is used. For example, a parameter set may comprise regression coefficients for a regression model. For example, a parameter set may comprise neural network coefficients for a neural network, etc.

The multiple machine learning models 330 typically have the same input format, which is may however be different from the local format. For example, a data feature, say, a material, may be encoded according to a different encoding scheme at different clients; e.g., according to a different encoding scheme in the local format than in the input format.

Typically, the models that are represented by the parameter sets, are the same models, e.g., all regression models, or all neural networks. In that case, the parameter sets are typically the same size, e.g., the same number of parameters. It is not required though to enforce the same model at each client; For example, one could have a regression model next to a random forest model.

The models that are received at client 300 may be in a raw format, e.g., comprising explicitly all parameters of the trained model. The parameters may be received in a compressed format. The compression may be a general purpose compression scheme, e.g., the deflate compression algorithm described in RFC 1951. Advantageously, a model is compressed with reference to a previous version of the model. For example, client 300 may be configured to receive a model update from federation server 370 that updates a previously stored trained parameter set. For example, the federation server 370 may store locally the same model as client 300 is storing. Federation server 370 may compute a difference between the current model and the updated model. The difference may be further compressed using general purpose compression. Compression may be loss-less or lossy. For example, the difference set may be rounded.

Federation client 300 is configured to apply multiple trained models, e.g., all or multiple of the stored models 330. One of the stored models is typically a locally trained model, although this is not necessary. The input format that models 330 expects differs from the local format of local record 311. This is addressed by performing a mapping.

Client 300 comprises a mapping unit 320 configured to apply a data mapping rule to obtain a mapped record 321 according to the input format. For example, mapping unit 320 may have access to a mapping rule base 322 that indicates the rule and/or how it is to be applied. At least one data feature of the multiple data features in the local record is mapped according to a data mapping rule. The mapping rule may be configured by configuring the mapping rule base 322. Examples of different mapping rules are described herein.

There are various types of mapping rules. For example, in an embodiment, the mapping rule generalize a data feature by mapping a first range of the data feature to a second reduced range. For example, it may well happen that the local database uses an encoding that is different from the encodings used elsewhere. For example, suppose a local database uses particular article identifiers, then it may well happen that other clients uses different article identifiers. In fact, the other clients may use different articles. This difference is problematic for two reasons. First of all, the different encodings prevent the models trained on records of a first client to be applied to records of a second client. Second, even if that application were possible, the model is unlikely to generalize successfully, if the articles on which the model is learned only occur at one particular client. These problems can be addressed by mapping a data range used in the local format to a different data range used in the input format. For example, suppose two clients each use their own article identifiers for their particular articles, then both ranges can be mapped to a combined range that generalizes both ranges. This may be a species to genus mapping. For example, if a client uses say ids 4627855-4627955 to indicate various types of articles, e.g., pencils, then this range of values could be mapped to a single ID representing the article in general, e.g., a pencil. A second client may use, say, 299523-301523 for to indicate various types of its articles, e.g., pencils. These articles may be the same or partially the same as those of the first client, but they may also be different. The mapping rule for the second client will map the range ids to the same identifier for the general class of articles, e.g., pencils. This has multiple advantages, learning is improved as more data is available by pooling data from the participating clients, even though no actual data needs to be shared. Learning is also improved as the model can combine data for different articles id for the same learning goal.

Another example of a mapping rule is to extend the number of data features by mapping the data feature to multiple extended features. For example, a record may be extended using an ontology. For example, a record may be extended by looking up properties of the articles and including them in the record, e.g., weight, or cost, etc.

In an embodiment, the multiple models 330 are applied to the mapped record 321 produced by mapping unit 320. As a result, multiple model results 350 are obtained, e.g., one for each model in the multiple models 330. In a typical example, all models in multiple models 330 use the same input format and are applied to the same record 321; variants are possible though. Shown are model result 351-353. One of the model result may be obtained by applying a locally trained model. This is not strictly necessary. For example, the local database of a client may have too few records for a meaningful model to be trained. The locally trained machine learning model may be applied to the mapped record 321. There are other options for using a locally trained model as further expanded upon herein.

In an embodiment, the local database 310 and the model that is currently applied are stored in the same electronic memory to reduce access time.

In an embodiment, models 330 are each trained on a participating federation client on multiple training records that are local to the client on which the model is trained. In this case, model 330 may comprise as many models as there are participating clients. There could be fewer models than clients, e.g., if some clients do not yet have a locally trained model.

Another option is that one or more of the models in models 330 are aggregates of two or more locally trained models. For example, server 370 may receive the two or more locally trained models and aggregate them in a single aggregate model. The aggregating may comprise averaging the parameters; for example, this may be done for linear regression models. For example, server 370 may train a new model to predict the combined output of the two or more local models. Other aggregation algorithms may be applied. In an embodiment, though model 330 comprises multiple models, one or more or all-but-one may be aggregated models, and at least one may be a local model. The multiple models 330 are applied to obtain multiple model results which may be combined, e.g., by ensemble combining, e.g., as described herein.

Federation client 300 may comprise a combining unit 360 configured to combine the multiple model results 350 into a combined model result. For example, the combining unit 360 may be configured to average at least the multiple model results. The averaging may be weighted or unweighted. The weighting may indicate the relevance of the model that produced the result. For example, models that are trained on more records may receive a higher weighting. This has the advantage that models that are more likely to be accurate due to more training data have move influence on the combined result. For example, models that are trained on more relevant records may receive a higher weighting; e.g., records that are obtained from a similar field as the local records; In particular, locally trained models may receive a higher weighting. This has the advantage that models that are more likely to be accurate due to a similar data distribution have move influence on the combined result.

Combining may also be done by majority voting among at least the multiple model results. Majority voting may likewise be weighted. For example, a yes/no prediction that indicates, e.g., whether or not an article will be delivered at all, may be averaged by voting. Weighting in majority voting may be implemented by assigning more votes to a particular model. For example, a likelihood that indicates the probability whether or not an article will be delivered, may be averaged by arithmetical averaging.

Weighting of models may increase accuracy of the combined model. For example, if large models are weighted more heavily, then model predictions will be slanted toward the predictions of the larger model. However, the other models agree on another prediction they can together move the prediction result.

Combining may use more complex algorithms than averaging or majority voting. For example, combining may comprise any kind of nonlinear regression, classification, and the like.

In an embodiment, a federated learning system comprises multiple clients, each client being configured with a different mapping rule. In an embodiment, the system further comprises a server.

Figure 3B:
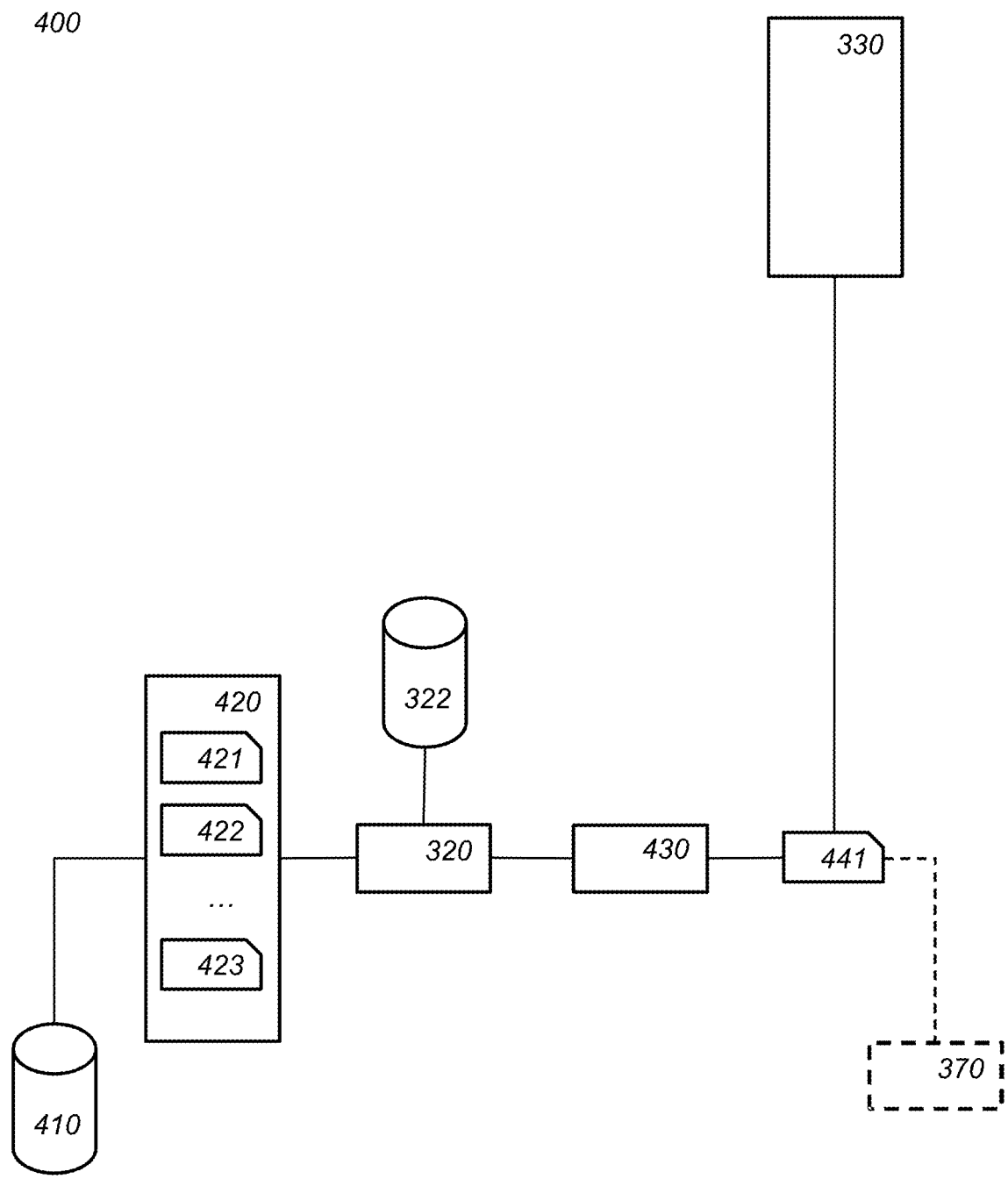

FIG. 3b schematically shows an example of an embodiment of a federation client 400.

Federation client 300 is configured to participate in the federated learning system by applying the trained federated model for inference. Federation client 400 is configured to participate in the federated learning system by contributing to training the federated model. Federation clients 300 and 400 may be different devices or system. Typically, however, a federation client may be configured according to federation clients 300 and 400, that is, configured for inference as well as training.

Federation client 400 comprises a local database 410. This may be the same as database 310. Database 410 may instead be a dedicated database for training. A selection criterion may be applied to the local database to obtain multiple local training records 420 selected from the local database. Shown are local records 421, 422 and 423. Typically, many more records than the three shown, are used in training. The training records are according to the local format. A model that is directly trained on the local records would not be useful to other clients as they do not have records in the same format—the local formats of different client generally being different. The selected records are preferably records for which the dependent variable that is to be learned is known. For example, to learn delivery date prediction, records may be selected with a known delivery date.

Federation client 400 comprises mapping unit 320, which is configured to apply the mapping rule to multiple local training records 420 obtaining multiple local mapped training records according to the input format. The mapping rule applied to the local format used during training is typically the same as the mapping rule used during inference; during training a further mapping rule may be applied to ground truth values. The latter further mapping rule need not be used during inference.

Federation client 400 comprises a training unit 430 configure to train the local machine learning model on the multiple local mapped training records. The training algorithm depends on the type of model. For example, for a regression model a corresponding regression algorithm may be used. For a neural network model, a corresponding backtracking algorithm may be used.

The locally trained machine learning model is trained on a first federated machine learning client from multiple training records local to the first federated machine learning client. The end result of the training is a locally trained parameter set 441. It can be stored in models 330, for later use in inference. The locally trained parameter set 441 may also be sent to the federation server 370. Federation server 370 may store locally trained parameter set 441 and later distribute it to other federation clients. Note that the data on which parameter set 441 is trained are not sent to server 370. The one or more machine learning models received by server 370 may have been trained on further federated machine learning clients from further multiple training records local to the further federated machine learning clients.

Before training, the multiple local training records 420 may be partially scrambled. For example, noise may be added to one or more data features. For example, some values may be increased or decreased, e.g., with a small but random amount, etc. Partial scrambling may comprise masking and obfuscation. Some data values may be removed from the records before training. Partial scrambling reduces the probability of so-called inference attacks, in which information on records 420 is deduced from model 441. The risk of inference attacks is also reduced by the aggregating of server 370. Data may also be anonymized before training to reduce inference attacks. The mapping rule can contribute to anonymizing as well, e.g., by replacing supplier ID with descriptive relevant information, e.g., city, country, etc.

In an embodiment, local database 410 is stored in the same electronic memory as the training unit 430 and parameter set 441.

After training is complete, the trained model 441 may be updated when new data is obtained, e.g., when database 410 is extended. To send a model and in particular an updated model, similar data compression techniques may be used as can be used by server 370 when sending a model or updated model to client 300. For example, an update may comprise a difference between a current locally trained parameter set and a previously sent locally trained parameter set. The difference is likely to have predominantly small value, and as such is likely suitable for efficient compression, e.g., by a compression algorithm.

FIG. 4a schematically shows an example of an embodiment of a federation client 301.

Federation client 301 is similar to client 300, except that client 301 has access to an additional locally trained model. The multiple models 330 that are obtained from other clients through federation server 370, or which are aggregated by server 370 do not use information that is particular to database 310 and record 311. For example, for information to be useful on other clients, the mapping unit maps them, e.g., to generally applicable categories; categories that are likely to be applicable to multiple clients. This has the advantage that more data is available and that the model more easily generalizes over the category. However, in the process some local information that is valuable for prediction, but specific to client 301 may be lost.

In client 301, a further model with parameter set 341 is available. Further model 341 is trained (at least) on information that is specific to client 301. For example, further model 341 may be trained on the unmapped local records, and is thus applicable to the unmapped local record 311. For example, where the mapping rule may map, say, a supplier ID to a country code, the further model has access to the supplier ID, which the other models do not have access to. For example, where the mapping rule may remove some data, e.g., as being too sensitive, or particular to client 301, the further model can have access to it.

FIG. 4a shows unmapped local record 311 as an input to model 341, however, the information added by modeling rules 322 may also be added, e.g., as additional data features. Model 341 may also use extended feature introduced in record 321. For example, Model 341 may act on the union of records 311 and 321.

Figure 4B:
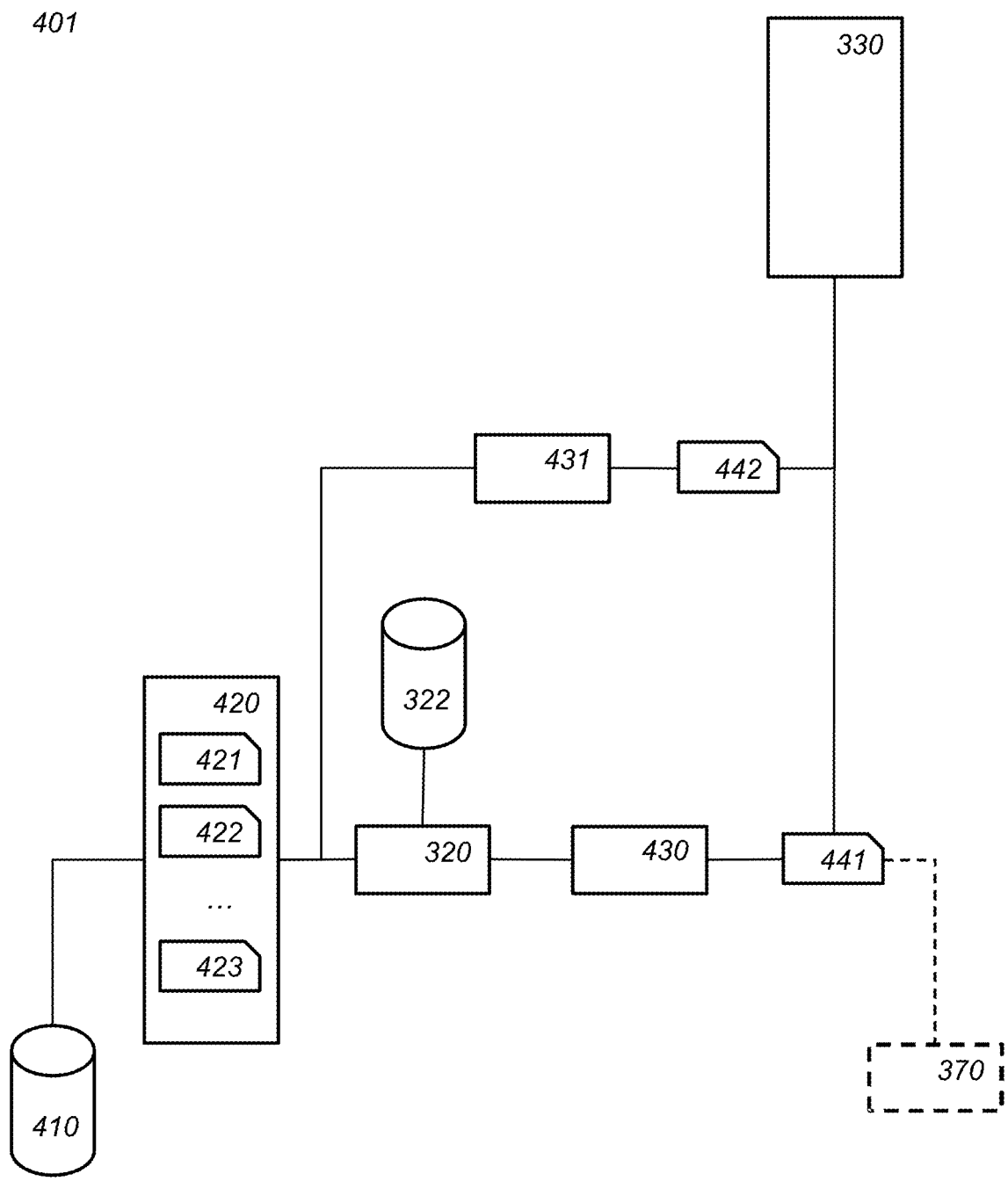

FIG. 4b schematically shows an example of an embodiment of a federation client 401.

Federation client 401 is similar to client 400, except that federation client 401 trains (at least) two models: one taking local input only available at client 401, and one for sharing with other clients taking the common input format. Federation client 401 may be used with or combined with federation client 301. Federation client 401 comprises a further training unit 431. Further training unit 431 is configured to train a further locally trained parameter set 442 for a further model. The further model differs from model 441 in that it has access in its inputs to parts of the local records 420 that are not available to training unit 430. For example, the locally trained machine learning model is applied to the record before mapping the record to the mapped record.

Thus, client 401 may train two models. One model has access to more specific data, e.g., without mapping a supplier ID to a country code, etc., or without censuring sensitive data. The second model is for sharing with other clients, e.g., through server 370. The second model is trained on the common input format. This may improve the quality of the combined result. The further model with access to additional data has the advantage of a richer data to base predictions on, while the other models received from the federation server 370 have the advantage that they may have access to more data and/or more diverse data. Experiments that for clients with access to large amounts of data, the locally trained model often outperforms federated learned models, especially in common situations for that client. For example, a combination rule may give a higher weight to the locally trained model, while allowing the federated learned model still to sway the combined result.

Further set 442 is stored in the multiple models 330, but is not sent to server 370. Client 401 also does not send the multiple local training records to federation server 370.

There are various options for the origin of the models in a federation client. Some of the possibilities include the following exemplifying embodiments. In an embodiment, a federation client stores n trained models, wherein

- 1 model is locally trained and shared with the federation server, while the n−1 other trained models are obtained from the federation server, who in turn received them from n−1 other federation clients.
- 1 model is locally trained and shared with the federation server, while the n−1 other trained models are obtained from the federation server. At least one, or more or, all of the n−1 other models are aggregated by the server from more than n−1 other models received by the federation server. n may be two.
- at least two models are locally trained. A first local model is trained and sent to the federation server, and a second local model is trained on additional local data and stored in the multiple models 330. The n−1 other trained models are obtained from the federation server, who in turn received them from n−1 other federation clients.
- at least two models are locally trained. A first local model is trained and sent to the federation server, and a second local model is trained on additional local data and stored in the multiple models 330. At least one, or more, or all, of the n−1 other models are aggregated by the server from more than n−1 other models received by the federation server. n may be two.

The number of models n may be 2 or more, 3 or more, 4 or more, 10 or more, etc.

In an embodiment, e.g., the embodiment described with reference to FIGS. 3*a*, 3*b*, 4*a* and 4*b*, federation server 370 may be omitted. For example, instead of the federation server, the federation clients may be configured with a peer-to-peer protocol, to receive and distribute models from and to other federation clients.

Figure 5A:
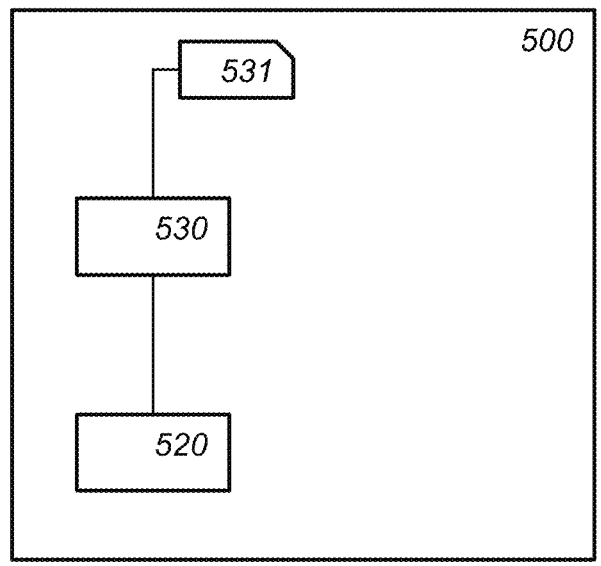

FIG. 5*a* schematically shows an example of an embodiment of a federation server 500. For example, federation server may be used as server 370 in FIGS. 3*a*, 3*b*, 4*a*, and 4*b*.

Federation server 500 is configured to receive models or model updates from participating federation clients. The received models or model updates represent training activity performed at the client. In a strict ensemble setting all of the received models are distributed to the participating models, so that each client receives all models of the other participating clients. For example, federation server 500 may comprise a scheduling unit 530 with access to scheduling information 531. For example, scheduling unit 530 may be configured to receive models according to a first schedule and to distribute models according to a second schedule. The receiving and distributing schedules need not be equal. The frequency of receiving models need not be the same for the different clients. For example, clients with high throughput with frequently updated models, may send their models to server 500 more frequently than other clients.

Scheduling unit 530 may be configured to manage lifecycles, e.g., model life cycles. Scheduling unit 530 may be configured for to manage clusters. For example, consider federation clients A, B, C and D, with models MA, MB, MC, and MD. If clients A, B and C have comparable data forming a cluster, then models MA, MB, MC may be distributed among A, B, and C; e.g., client B receiving models MA and MC, etc. Client D may have slightly different data, but client C coming closest. In which case, model MC may be distributed to client D. Model MD may be distributed to client C, but if A and B are much closer and have sufficient volume, this may not help client C. Accordingly, the scheduling information may indicate which of the received models, need to be distributed to which client. Clusters of clients can be programmed manually. However, clusters can also be established automatically based on a statistical measure of distribution closeness.

Server 500 may be configured for ML model lifecycle management, traceability, and/or reproducibility. For example, server 500 may record the origin of a model and the preprocessing that was used.

Model lifecycle management for machine leaning may comprise, e.g., continuously, or regularly assessing performance of a model and reacting accordingly, e.g., by changing a configuration of one or multiple local models, sending parameter updates, changing the way how models are combined to a "federated model". Furthermore model lifecycle management may entail procedures how and when to exchange, update, or sunset a model; how to do error handling or debugging; generally all kinds of operations topics Models and/or model updates that are received at server 500 may be stored in a machine learning model repository 520.

Figure 5B:
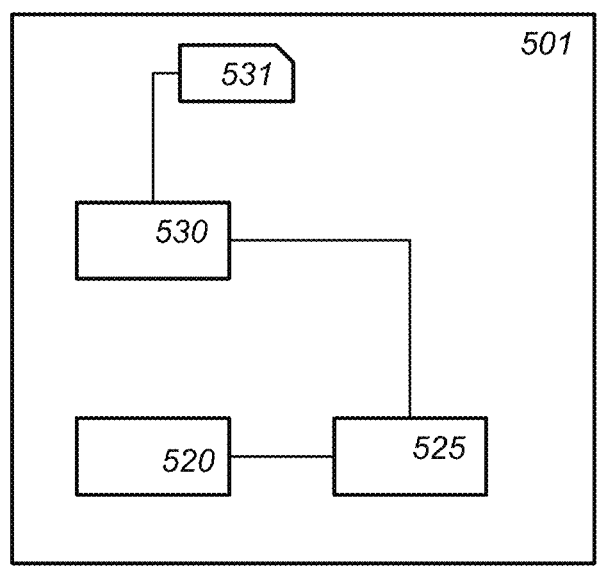

FIG. 5*b* schematically shows an example of an embodiment of a federation server 501.

Server 501 is similar to server 500, except for an aggregation unit 525. Aggregation unit 525 is configured to take as input two or more models received from federation clients and to generate a new model based upon them. Aggregating may be done directly on the level of parameters, e.g., by averaging the parameters in case of a linear model. Aggregating may also comprise training a new model with training data created by the input models. Other aggregation algorithms may be used.

Aggregation further reduces the risk of inference attacks, that a local model may be susceptible to. Aggregation of client ML models also improves scalability.

In an embodiment, a federation server assigns each federation client to a subset of the multiple federation clients, so-called clusters. Each cluster comprises multiple clients. A federation client is only sent models trained by clients in its assigned cluster. The models may be sent individually as an ensemble and/or in aggregated form. A cluster may comprise fewer clients than the total number of clients, and thus reduce network overhead. Clients in a cluster may have local data of similar statistics, so that a federated model based upon them has an increased accuracy.

Figure 6A:
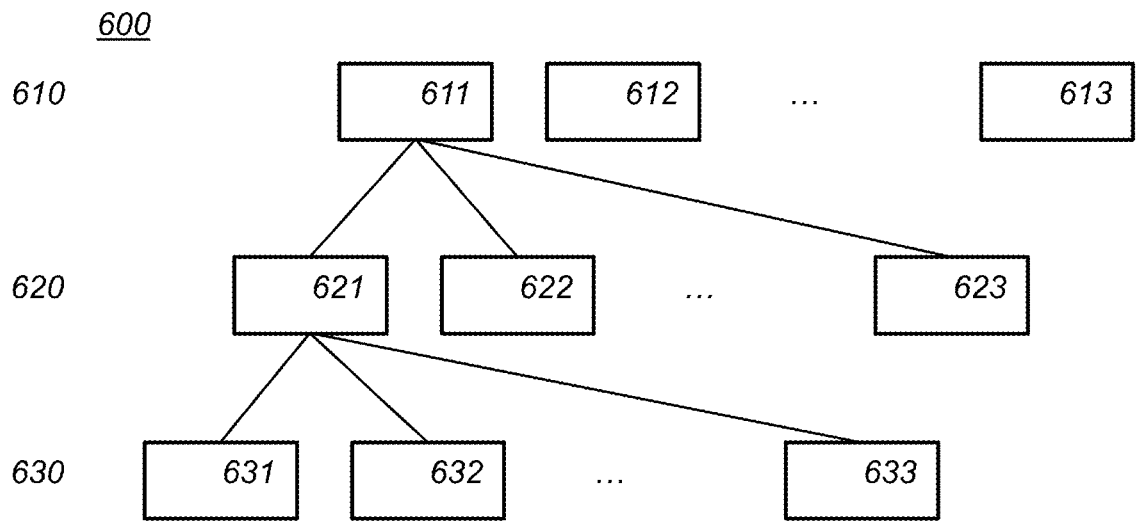

FIG. 6*a* schematically shows an example of an embodiment of a mapping rule using an ontology 600.

For simplicity not all of the ontology is shown. Ontology 600 has three levels as shown: top level 610, level 620, and lowest level 630. On level 620 only elements subordinate to element 611 of the top level is shown. On level 630, only elements subordinate to element 621 of the level 620 is shown.

A mapping rule using ontology 600 is applied to local records having data features that may take values according to the leaves of ontology 600. For example, a leaf may have the value of box 631. Once an association is made between the values of a data feature and a leaf, the record may be extended by the levels above it.

Ontology proved useful for example for local records that refer to cities. For example, ontology 600 may be a geographical ontology of places. Level 630 may represent, say, cities; level 620 countries and level 610 set of countries. For example, element 631 may represent 'Paris', element 621 may represent 'France', while element 611 may represent 'EU'. A local record with the element Paris may be mapped by a mapping rule based on ontology 600, to a mapped record with the features 'Paris, France, EU'. A different client may already store country information in its records, and so may use a truncated ontology.

Using the ontology helps to harmonize the input format for the models. The ontology also helps generalizing the data. For example, delivery times from, say, Shanghai to Paris are likely correlated to delivery times from Shanghai to other parts of France, or to delivery times from other parts of China. Without adding the information in the ontology the machine learning models do not know that these places are related. The ontology based mapping rule thus improves learning.

In an embodiment, the higher levels of an ontology are the same for all clients, while the leaves may differ between clients. For example, consider a fourth level in ontology 600 below level 630. Levels 610-630 may be the same across clients, while the fourth level may be different. For example, leaves at the fourth level may comprise local IDs identifying particular city. For example, a leave on a fourth level may have 'ID 847632' which may indicate Paris at that particular client. This ID can then be mapped to a common ID for the city that is the same across the multiple clients.

A geographic ontology is also very useful to map other types of IDs. For example, supplier IDs, destinations ID, and so on, can be mapped onto a vector of common ids.

In an embodiment, an ontology has at least three levels, including the leaves level.

Figure 6B:
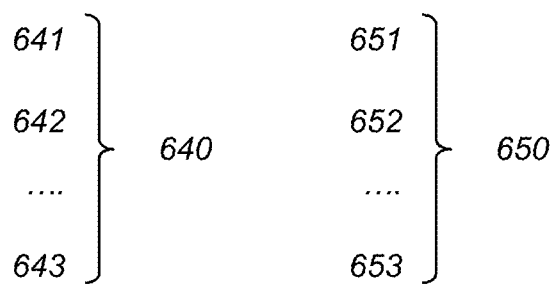

FIG. 6b schematically shows an example of an embodiment of a mapping rule.

Apart from geographical ontologies, an ontology may represent all kinds of data, especially discrete data. For example, the ontology may represent a classification of articles or material types. A particular shallow ontology, of only two levels is shown in FIG. 6b, which may also be regarded as species to genus mapping. For example, 641-643 may represent a first range of identifiers used in the local database, e.g., article ids, material types, etc. Element 640 may represent a corresponding genus. Likewise, codes 651-653 are mapped to genus 650. For example, particular article codes that represent particular articles may be mapped on an article class. For example, the article class may be a standardized article classification. On a different client, different codes, e.g., different articles codes or material codes may be used in the local format, however the mapping rule for the different client may map its different codes to the same genera. The upshot of this, is that a model may be trained and used on both clients, taking as inputs the genera, e.g., the codes represented by 640 and 650, even though locally they use a different encoding. For example, comparing the mapping of FIG. 6b on two clients, they may use the same higher level encodings 640 and 650 while the leaves 641-643 and 651-653 may be different depending on the local encoding format used at the particular client.

This type of mapping rule improves learning in general, by pointing out to the model that some articles codes are related, but also improves federated learning by allowing data which is encoded in different ways to contribute to the same federated model.

Figure 6C:
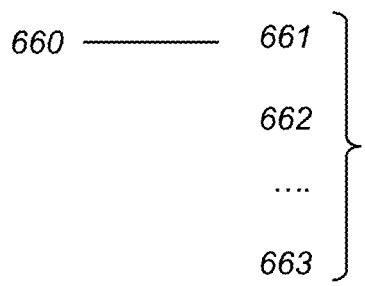

FIG. 6c schematically shows an example of an embodiment of a mapping rule.

Yet a further way to extend a data feature is to retrieve additional information for a data feature and to add the additional information to the record. One particular advantageous way to do this, is to add continuous type data to augment or replace the discrete data. For example, continuing the example above, an article ID or material ID may be augmented or replaced with data describing the type of article or material. For example, variables like weight, cost, dimensions may be retrieved and added to the record. Again this particular rule may be different on other clients. Other clients may use different codes, but may also have part of the additional information already in its records.

The additional features make the data more generalizable. For example, given a material ID, the material weight, price per piece and material volume may be added. The ML model may not be able to work with the material ID, but can predict from say material weight.

Additional information may also be added based on multiple data features. For example, one may have two data features of the multiple data features that represent locations. The distance between said two locations can be computed and added to extend a record. This helps federated learning as a model may not be able to generalize from, say, city information, but distances between two cities may correlate with delivery times.

Below a number of exemplifying mappings are shown. At the left, the data feature in the local record, on the right the data feature in the mapped record.

pencil #34=>pencil
    pencil #34=>pencil, office supplies
    Paris=>Paris, France, EU
    material ID=>descriptive data, in particular continuous data, such as, the material weight, price per piece and material volume
    two places=>distance A mapping rule may be encoded in a computer readable format, e.g., a look up table, database, XML file, and so on. In an embodiment, a mapping rule comprises a local part and a common part. The common part is the same across the clients and indicates the targets of the mapping rule. The local part is specific for the multiple clients and indicates which local values of a local data features are mapped to which values in the common part. For example, the local part may comprise multiple non-overlapping ranges, and the common part may comprise multiple target values associated with the multiple ranges. The mapping rule mapping a value in a specific range of the multiple ranges in the local part to the associated target value in the common part.

Figure 6D:
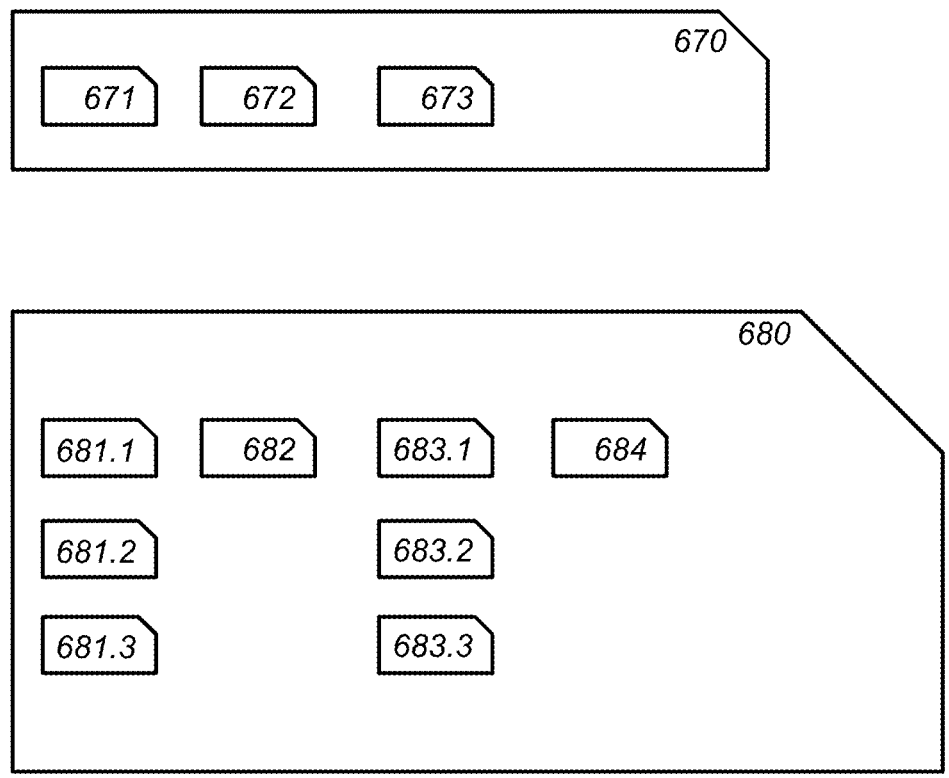

FIG. 6d schematically shows an example of an embodiment of a local record 670 and a mapped record 680.

As shown, local record 670 has five data features 671-674. Some features may remain unchanged. For example, feature 682 may be the same as feature 672. For example, feature 671 may be expanded according to an ontology. For example, feature 673 may be extended with additional descriptive information 683.1-683.3. For example, an additional feature may be created, e.g., feature 684 may represent the distance between two locations.

In an embodiment, generalizing the data feature comprises mapping a species to a genus according to an ontology. In an embodiment, a federated machine learning method comprises identifying the data feature in an ontology, mapping the data feature to multiple extended features comprising mapping multiple levels in the ontology hierarchically at or above the data feature to the multiple extended features.

EXAMPLE

Embodiments solve a technical problem in the training of federated models. Such improved training can be applied to various modelling needs. A number of non-limiting examples are described below.

Consider, in a first example, materials required for production which are supplied by multiple suppliers. A delay in delivery can impact on-time production at the plant and cause rescheduling of assembly lines, which are costly. Indirect material delay also causes interruption in supporting employees with required products or services. A machine learning model may be used to predict the chances of a delay based on multiple factors. This use case has been successfully implemented in a prototype using SAP HANA's Automated Predictive Library (APL) using four simulated clients.

This machine learning use case may leverage a regression model trained on historic shipments to predict delays of purchase orders. Delays of shipments are not exclusively client-specific, but often depend on more generic factors similar across clients. This makes Federated Learning well suited. A mapping rule was developed that maps the local formats to a common input format that reflects the relevant data features. For example, sensitive information may be removed, and client-specific features such as material ID or material types may be transformed into other features, e.g., as described herein.

In the prototype, supplier IDs were replaced with city, country, subregion and region, and computed shipping distances between origin and destination where added. Client-specific material IDs were replaced with transferable properties such as weight, volume, or price per unit (in material base unit). Similarly, supplier IDs were replaced with secondary information such as supplier country, subregion, and region. Company-specific product IDs were replaced by using industry-wide product catalogues.

A similar example is to predict how long transport of an article may take. Having a prediction how long transportation from A to B may take, translates in business decision on which type of transportation to use, or which supplier to use. Other examples include prediction of payment dates of invoices.

EXAMPLE

Mapping may also be applied to ground-truth values. Just as with input values, also the ground truth values which are to be predicted may be specific to the various clients. A similar mapping rule may be applied to the ground-truth values to make them comparable across the clients. For example, in an object classification model, the model takes (at least) as image as input. The classifier produces as output a classification of the image.

Consider N clients, each owning a subset of catalog articles, a joint computer vision model is trained to predict material classes. The material classes are mapped to a common output format using a mapping rule. For evaluation, also a central model was trained on all data, local models for each client on its local data and a federated model on all data using a federated learning algorithm. In this case, model aggregation was used at the federation server.

Experiments have shown that the federated learning model performs nearly as good as a central model—even if the material classes only overlap partially or are even completely disjunct. Federated learning can lessen the cold start problem for new clients having too few samples for training. The federated model clearly outperforms local models on an unseen client dataset

EXAMPLE

Embodiments address various problems with machine learning, e.g., as encountered in practice. For example, applying machine learning to larger quantities of data without centrally pooling the data, even if the data is disparate and without a common format. For example, the cold start problem, where a client wants to participate to use machine learning but has at present to little data to work with. For example, the problem of generalizing from discrete data such as identifiers without inherent meaning. These embodiments can be applied to a wide range of data.

A particular application as pointed out herein is to historic business data where these problems are particularly apparent. However, other types of data can benefit from embodiments too. Consider for example, a medical application in which multiple clients have access to medical data, including one or more sensor data obtained from sensors, e.g., blood pressure and the like. The data may in particular include medical image data. The data may also include patient data, including identifiers that encode for various aspects, e.g., affliction, medical specialization, etc. A model may be trained to predict future events or predict a classification, e.g., a patient outcome. The clients can pool their data using federated learning according to an embodiment. A mapping rule may be employed as explained herein. For example, a mapping rule may map medical identifiers to continuous variable, and/or to classes that are common to the multiple clients.

Federated Learning application in the context of sensors include:
Predicting machine failures based on sensor data. For example, one or more sensors may be configured for vibrations, sound, RPM, exhaust measurements, pressure, temperature, etc. Federated Learning would be used to learn failures not of each machine individually, but of a fleet for machines, possibly operated by multiple different companies.
Connected agriculture: learn best vegetable growing conditions based on sensor measurements. For example, sensors may be configured for imaging, sensing soil conditions across multiple farmers/farming companies, to optimize growing conditions later on.

EXAMPLE

Yet a further exemplifying application of an embodiment is in predictive maintenance. In predictive maintenance one predicts when maintenance should be performed on some object based on observable features related to the object. Improved quality may result since an object may be maintained before failure thus avoiding down-time. At the same time, maintenance is avoided on objects that do not need it, based on the prediction. For example, a federated model may estimate the degradation state of an item. For example, an ML model may be applied to known variable related to the condition and/or use of the object, for forecasting its future states.

As failures are relatively rare, e.g., compared to non-failure states, collection a sufficient amount of high quality data can be challenging. Embodiments can address this problem. For example, predictive maintenance may be applied in railway to estimate the failure times for trains or rail. For example, predictive maintenance may be applied in lighting systems, to predict failure of lighting elements, e.g., LED devices.

In the various embodiments of system 210 and 260, the communication interfaces may be selected from various alternatives. For example, the interface may be a network interface to a local or wide area network, e.g., the Internet, a storage interface to an internal or external data storage, a keyboard, an application interface (API), etc.

The systems 210 and 260 may have a user interface, which may include well-known elements such as one or more buttons, a keyboard, display, touch screen, etc. The user interface may be arranged for accommodating user interaction for configuring the systems, training the networks on a training set, or applying the system to new sensor data, etc.

In the embodiment described herein, storage, e.g., storage 240 or 280 may be implemented as an electronic memory, say a flash memory, or magnetic memory, say hard disk or the like. Storage may comprise multiple discrete memories together making up storage 240, 280. Storage may comprise a temporary memory, say a RAM. The storage may be cloud storage.

System 210, 260 may be implemented in a single device. System 210 or 260 may be implemented in a single device. Typically, client 210 and server 260 each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, client 210 and server 260 may comprise circuits for the evaluation of models, say, neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Below several further optional refinements, details, and embodiments are illustrated.

Figure 7A:
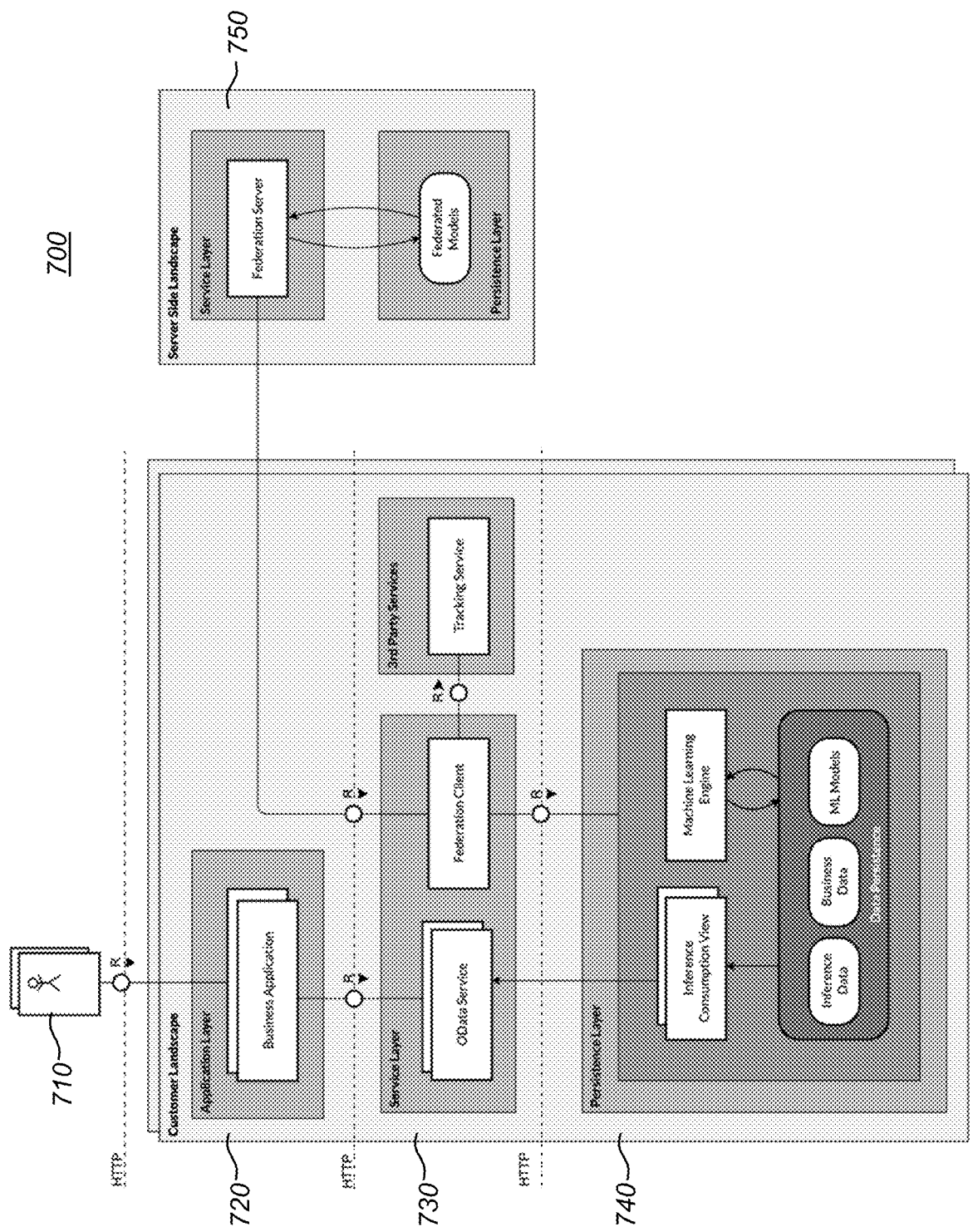

FIG. 7a schematically shows an example of an embodiment of a federation client-server system 700.

Federation client-server system 700 is a worked exemplifying embodiment. A successful protype of federation client-server system 700 has been built demonstrating the concepts shown herein. Federation client-server system 700 was built as an embedded S/4HANA use case using HANA's Automated Predictive Library (APL) to train local machine learning models. It should be pointed out however, that embodiments are not limited to S/4HANA, as many different embodiments, e.g., using different software is possible, e.g., according to embodiments as described herein.

The various parts shown in FIG. 7a may be implemented in software, e.g., using a programming language such as Python or the like. In this embodiment, application program interfaces (APIs) are used to communicate between the various parts shown in FIG. 7a. Dotted lines in FIG. 7a represent different architectural components. Nodes labeled with the letter R denote an interface to send a request. The arrow indicates the direction from where and to where the request is made. For example, use was made of HTTP requests to access and use data. Other types of APIs may be used instead.

In this embodiment, models are trained on historical business data. The prototype can however be straightforwardly adapted to other applications, e.g., medical applications, image classification and the like.

Based on the models trained in federation client-server system 700 predictions are generated periodically and persisted as inference data. A corresponding business application consumes the inference data through an OData service and its inference consumption view. Also here, OData is an example of this implementation, other protocols may be used instead.

For example, the prototype was applied to a supplier delivery prediction use case. Four clients have their own system landscape in place. A new ML model version gets trained independently for each client, based on their own historic purchase orders. Since all clients are part of the federation, the Federation Server requests each local model and distributes all of them to all participants. Finally, the new predictions, produced by the federated model, are highlighted in the purchaser's worklist.

FIG. 7a shows an end-user application 710, e.g., running in a web browser, configured to access a client system. FIG. 7a shows a client system, e.g., in this case, implemented as a customer landscape. The customer landscape may be, e.g., an S/4 customer landscape, but this is not needed. In this embodiment, the client system is organized in three layers: an outer layer 720, an intermediate layer 730 and an inner layer 740. FIG. 7a shows a server system 750, e.g., in this case, implemented as a Server landscape. The implementation shown in FIG. 7a is a particularly advantageous way to organize a federation client-server system and the requests made therein, however, other organizations are possible.

Outer layer 720 comprises, e.g., in this case, an application layer running one or more business applications. End-user application 710 is configured to interface with the business applications, e.g., to request model predictions.

Intermediate layer 730 comprises, e.g., in this case, a service layer and 3rd party services. The service layer comprises an OData Service and a Federation client. The 3rd party services may comprise a tracking service, e.g., configured to tracking the changes made to the models, e.g., training steps, inference steps and the like.

The OData service is a service configured, inter alia, to expose predictions using a URL. The Tracking service is a service configured to assess the quality of the model, and to log model interactions, e.g., when the model was trained. The federation client is configured to expose the local models to the federation server. The federation client is configured to receive and deploy ensemble models and to trigger the federated inference by combining the results of the ensemble models.

The inner layer 740 comprises a persistence layer which in turn comprises machine learning parts. An Inference Consumption View is implemented and a machine learning engine. For example, the machine learning engine may be HANA APL, which is an Application Function Library (AFL) configured with functions supporting model training and model inference. Other libraries may be used instead of HANA APL. For example, one may use Google Tensorflow for the machine learning engine.

The inference consumption view and the machine learning engine both interface with a data persistence part. The data persistence comprises Inference data, Business data and Model storage.

FIG. 7*a* also shows a server system 750. Server system 750 is configured to retrieve local models from the Federation clients, concatenate them and to distribute them to all clients. Server system 750 comprises a federation server interacting with a federation models repository.

Many parts of system 700 are optional and/or can be varied. For example, the intermediate layer 730 and/or outer layer 720 may omitted; For example, the two or three layers can be combined into one; For example, the 3rd party services can be omitted; For example, various unit may be omitted or combined; For example, the federation server and model repository could be combined; for example, the federation client could be comprised in the inner layer; and so on.

Figure 7B:
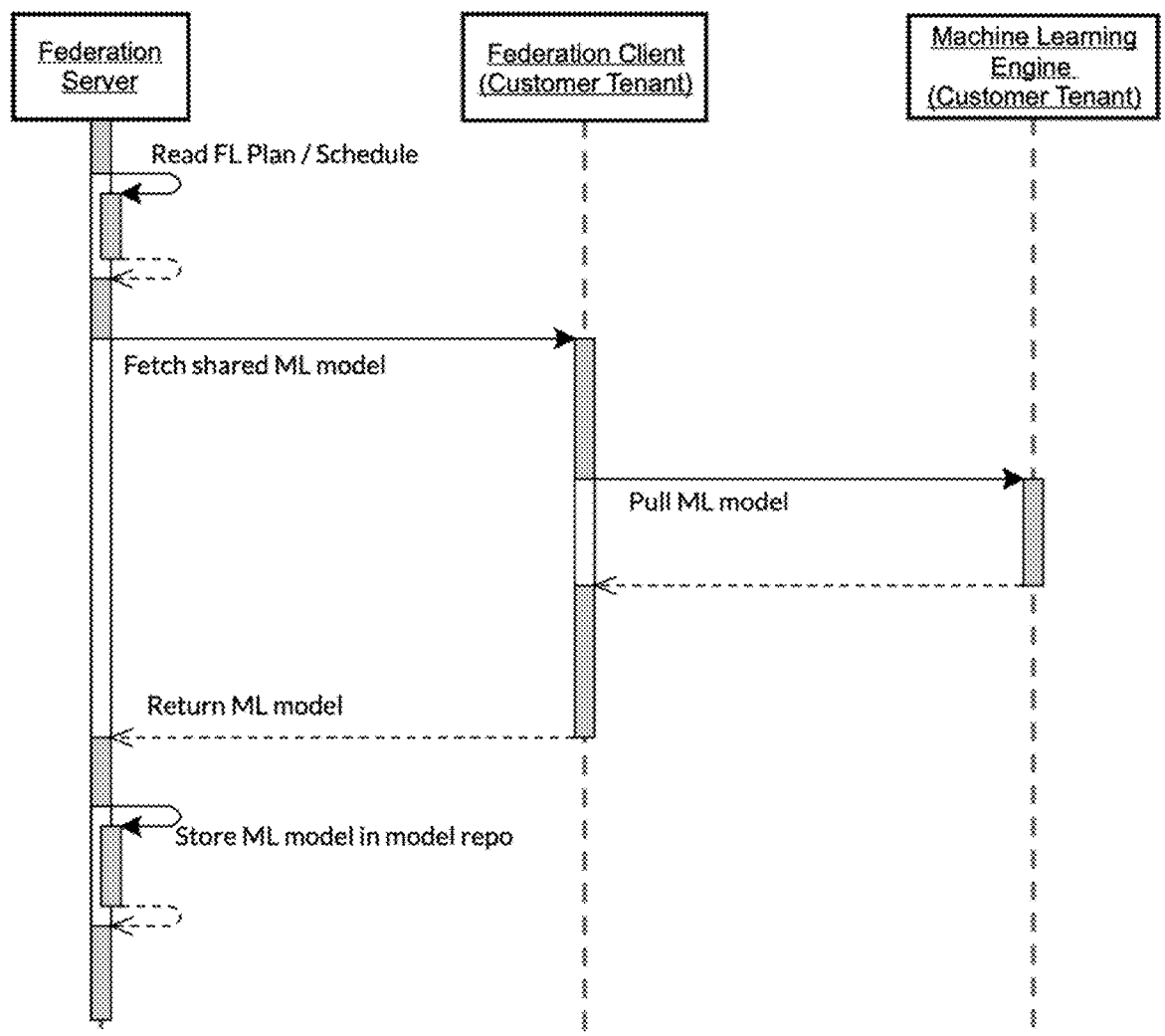

FIG. 7*b* schematically shows an example of a sequence diagram related to an embodiment of a federation client-server system.

For example, the sequence diagram may be used in a federation client-server system according to an embodiment, including but not limited to, the embodiment shown in FIG. 7*a*.

Shown in FIG. 7*b* are three entities: Federation server; a Federation client, in this case running on a customer tenant; and a machine learning engine, also running on a customer tenant. FIG. 7*b* shows the following requests in the following order:

Federation server: Read federated learning plan, or schedule.

Federation server: Fetch shared ML model

Federation client: Pull ML model and return the ML model

Federation server: Store the ML model in a model repository

In response to the requests the entities respond with the requested data.

The sequence diagram in FIG. 7*b* may be used, e.g., to train the federated model. In this case the federated model is an ensemble model comprising multiple locally trained (sub) models. Other types of aggregation than ensemble learning can be used, e.g., aggregation via a dedicated unsupervised or supervised machine learning model at the federation server.

Figure 7C:
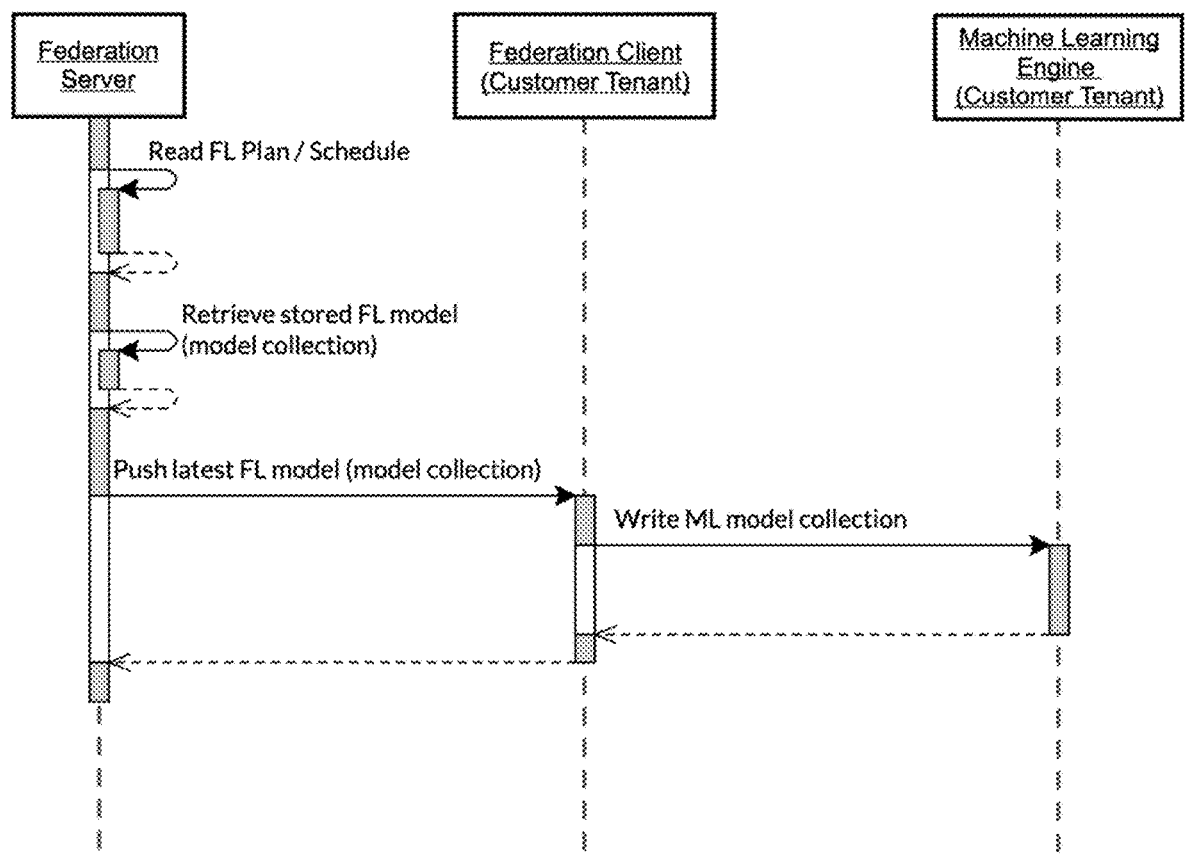

FIG. 7*c* schematically shows an example of a sequence diagram related to an embodiment of a federation client-server system.

For example, the sequence diagram may be used in a federation client-server system according to an embodiment, including but not limited to, the embodiment shown in FIG. 7*a*.

Shown in FIG. 7*c* are three entities: Federation server; a Federation client, in this case running on a customer tenant; and machine learning engine, also running on a customer tenant. FIG. 7*c* shows the following requests in the following order:

Federation server: Read federated learning plan, or schedule.

Federation server: Retrieve stored FL model, in this case a model collection

Federation server: Push latest FL model, in this case a model collection

Federation client: Write ML model collection

The sequence diagram in FIG. 7*c* may be used, e.g., to distribute the federated model. In this case the federated model is an ensemble model comprising multiple locally trained (sub) models. Other types of federated learning than ensemble learning can be used, e.g., model aggregation at the federation server.

Figure 7D:
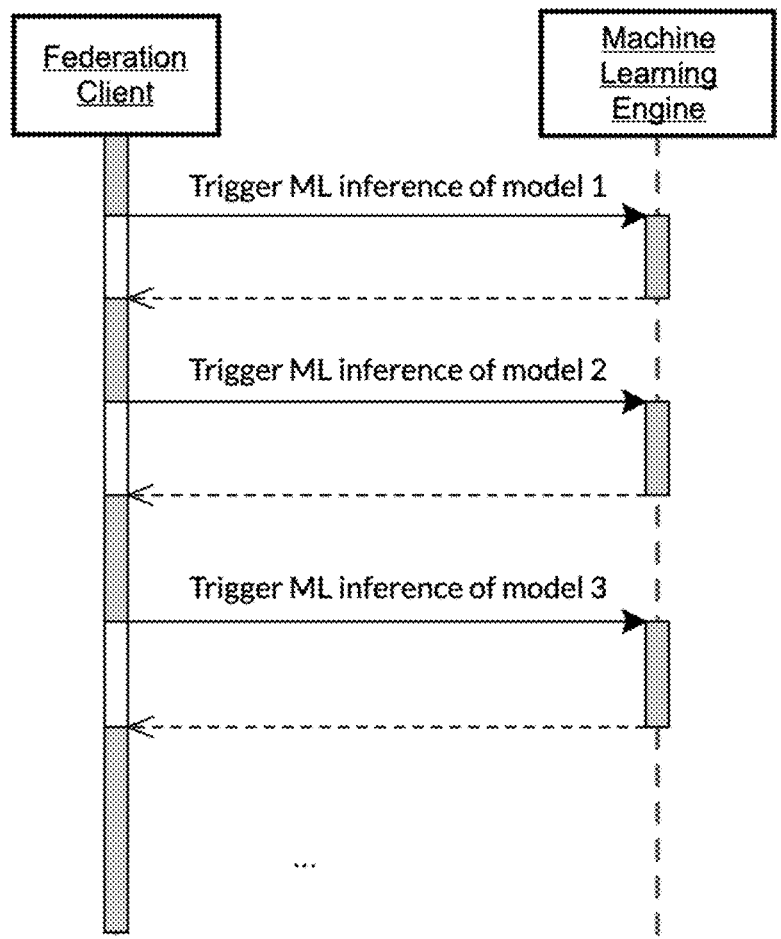

FIG. 7*d* schematically shows an example of a sequence diagram related to an embodiment of a federation client-server system, For example, the sequence diagram may be used in a federation client-server system according to an embodiment, including but not limited to, the embodiment shown in FIG. 7*a*.

Shown in FIG. 7*d* are two entities: a Federation client, in this case running on a customer tenant; and a machine learning engine, also running on a customer tenant.

FIG. 7*d* shows the following requests in the following order:

Federation client: Trigger ML inference of model 1

Federation client: Trigger ML inference of model 2

Federation client: Trigger ML inference of model 3

The sequence diagram in FIG. 7*d* may be used, e.g., to apply the federated model for inference. In this case the federated model is an ensemble model comprising multiple locally trained (sub) models. Other types of federated learning than ensemble learning can be used, e.g., model aggregation at the federation server. For example, one may have one locally trained model and one aggregated model received from the federation server.

Not shown in FIG. 7*d* is a combination step that typically follows triggering the inferences. For example, the model results obtained from the machine learning engine may be averaged, etc.

Figure 7E:
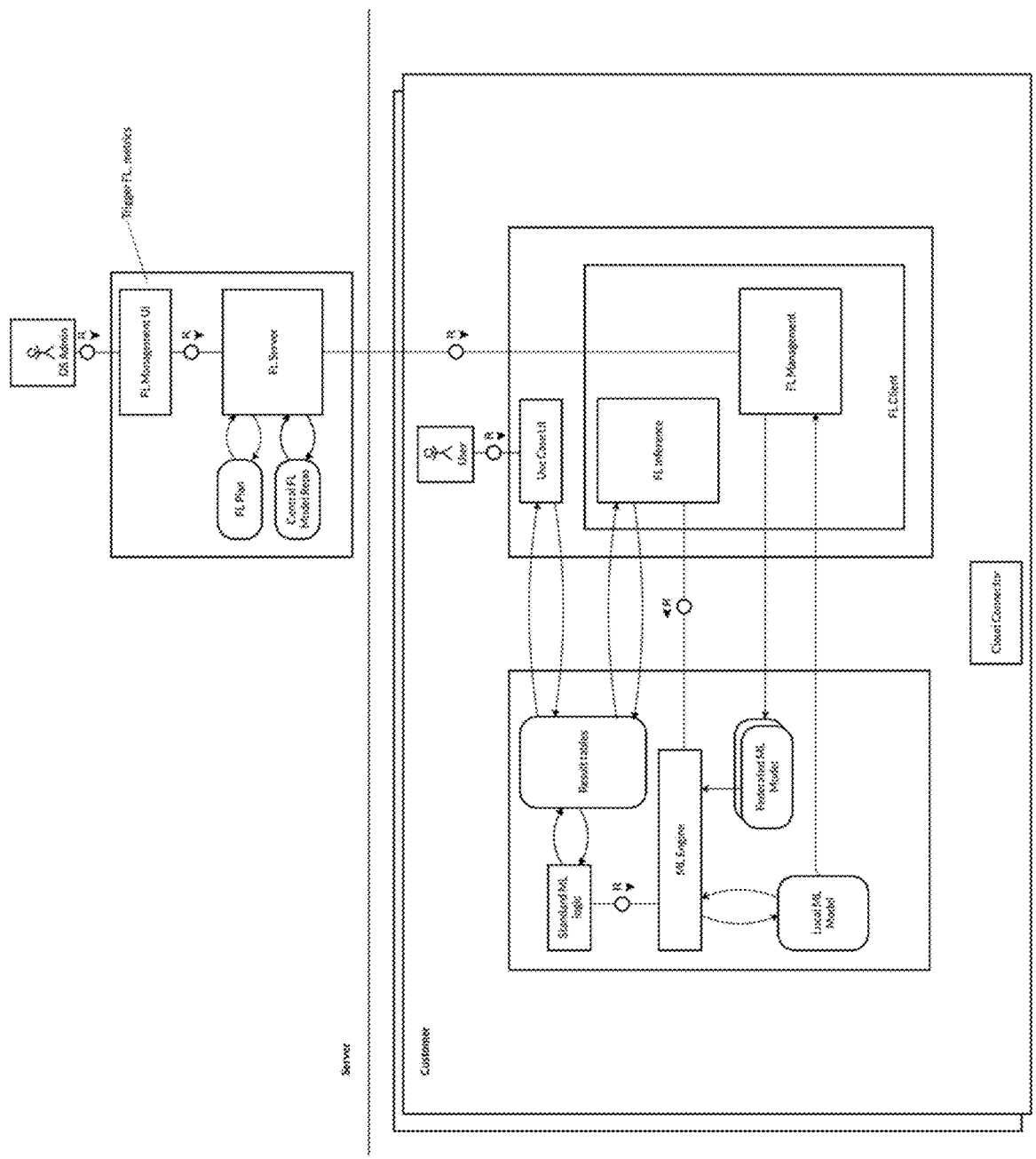

FIG. 7*e* schematically shows an example of an embodiment of a federation client-server system.

Shown in FIG. 7*e* is a federation server system comprising a FL Management UI, and a federation server (FL server). The federation server has access to, e.g., a FL plan and a central FL model repository. For example, a user of the federation server system, e.g., an administrator can use the user interface to trigger the federation learning, to show metrics, and the like.

Shown in FIG. 7*e* is a federation client system. The federation client system comprises a machine learning part comprising a machine learning engine. The machine learning engine has access to a local machine learning model and to federated ML models. Typically, the local machine learning model are trained and used for inference while the federated ML models are only used for inference. The ML engine may be configured both for training and for inference. Shown in the machine learning part are standard ML logic, which may, e.g., request from the ML engine an inference. A result of an inference may be result tables.

Shown in FIG. 7*e* is a federated client, e.g., a federated learning part. The federated learning part comprises a Use case UI, which may be used by a user to interface with the federated learning part, e.g., to request federated model inferences, and the like. The federated learning part may comprise a federated learning inference part, which may be configured to instruct the machine learning engine to perform inference using multiple models, including one or more federated ML models, and the local ML model. The resulting inferences are collected and combined by the federated learning inference, and may e.g., by reported to the user, e.g., through the user interface. The federated learning part further comprises a federated learning management, which may be configured for collecting the local ML model and to send it to the FL server. The federated learning management may be configured to receive the federated ML model(s) and to install them in the machine learning part.

Interestingly, the machine learning part does not require to be adapted to federated learning and may be oblivious that there is a federated learning part of a federated server system. The machine learning part and the federated learning part may be combined locally, e.g., on one device or on multiple locally connected devices. Either part may also be implemented in the cloud. For example, the machine learning part may be running in the cloud, and/or the federated learning part may be running in the cloud. The two parts can be connected with a cloud connector.

FIG. 8a schematically shows an example of a flow chart related to an embodiment of a machine learning method 800.

Method 800 is computer-implemented and comprises:
  receiving (810) from a federation server one or more trained parameter sets representing one or more machine learning models, the machine learning models having the same input format,
  obtaining (820) a record from a local database for running inference on, the record comprising multiple data features according to a local format, different from the input format,
  for at least one data feature of the multiple data features, applying (830) a data mapping rule to obtain a mapped record according to the input format, wherein the mapping rule is configured to
  generalize (840) the data feature by mapping a first range of the data feature to a second reduced range, and/or
  extend (850) the number of data features by mapping the data feature to multiple extended features,
  applying (860) the one or more machine learning models to the mapped record, as well as applying a locally trained machine learning model, thus obtaining multiple model results,
  combining (870) the multiple model results into a combined model result.

FIG. 8b schematically shows an example of a flow chart related to an embodiment of a federated machine learning distribution method 900

Method 900 is computer-implemented and may comprise
  receiving (910) at a federation server one or more trained parameter sets representing one or more machine learning models, the machine learning models having the same input format,
  sending (920) from the federation server one or more trained parameter sets representing one or more machine learning models to a federated learning client.

Methods 800 and 900 may be extended and/or varied, e.g., in accordance with embodiments shown herein. A machine learning method may be computer implemented. For example, accessing training data, and/or receiving input data may be done using a communication interface, e.g., an electronic interface, a network interface, a memory interface, etc. For example, storing or retrieving parameters may be done from an electronic storage, e.g., a memory, a hard drive, etc., e.g., parameters of the networks. For example, applying a model, e.g., a neural network, to data of the training data, and/or adjusting the stored parameters to train the model may be done using an electronic computing device, e.g., a computer. The models may have multiple parameters, e.g., at least 2, 5, 10, 15, 20 or 40, 1000, 10000, or more, etc.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 800 and/or 900. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 9A:
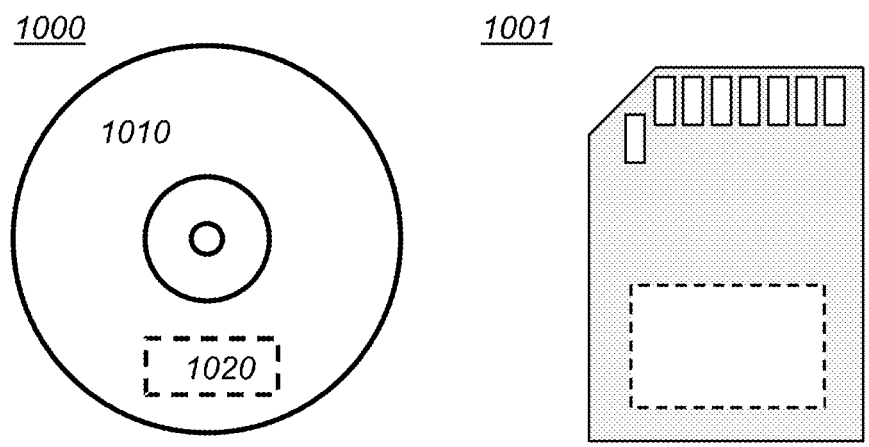

FIG. 9a shows a computer readable medium 1000 and a computer readable medium 1001.

The computer readable media have a writable part storing a computer program. Computer readable medium 1000 shows the writable part 1010 and computer program 1020. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a machine learning and/or distribution method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said machine learning and/or distribution method.

Figure 9B:
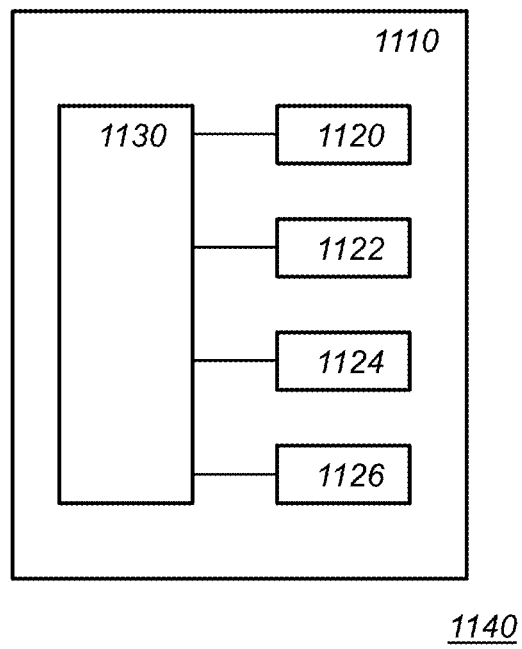

FIG. 9b shows in a schematic representation of a processor system 1140 according to an embodiment.

The processor system comprises one or more integrated circuits 1110. The architecture of the one or more integrated circuits 1110 is schematically shown in FIG. 9b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., a machine learning and/or distribution device may comprise a processor circuit and a memory circuit, the processor being arranged to execute software stored in the memory circuit. For example, the processor circuit may comprise one or more microprocessors. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It will be apparent that various information described as stored in a storage may be stored in an electronic memory. In this respect, a memory may also be considered to constitute a "storage device". Various other arrangements will be apparent. Further, a storage may be considered to be "non-transitory machine-readable media." As used herein, the term "non-transitory" will be understood to exclude transitory signals but to include all forms of storage, including both volatile and non-volatile memories.

While device 1140 is shown as including one of each described component, the various components may be duplicated in various embodiments. For example, a processor may include multiple microprocessors that are configured to independently execute the methods described herein or are configured to perform steps or subroutines of the methods described herein such that the multiple processors cooperate to achieve the functionality described herein. Further, where the device 1140 is implemented in a cloud computing system, the various hardware components may belong to separate physical systems. For example, the processor may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

What is claimed is:

1. A computer-implemented federated machine learning method, the method comprising:

receiving one or more trained parameter sets representing one or more machine learning models, the machine learnable models having the same input format;

obtaining a record from a local database for running inference on, the record comprising multiple data features according to a local format, different from the input format;

for at least one data feature of the multiple data features, executing instructions, by one or more processors, to apply a data mapping rule to obtain a mapped record according to the input format, wherein the application of the mapping rule:

generalizes the data feature by mapping a first range of the data feature to a second reduced range, and/or extend the number of data features by mapping the data feature to multiple extended features, applies the one or more machine learning models to the mapped record and to a locally trained machine learning model to obtain multiple model results, and combines the multiple model results into a combined model result;

wherein two data features of the multiple data features represent locations, extending the number of data features comprising computing a distance between said two locations, and including the distance in the multiple extended features.

2. A federated machine learning method as in claim 1, the method comprising:

applying a selection criterion to a local database obtaining multiple local training records selected from the local database, the training records being according to the local format, applying the mapping rule to at least one data feature of the multiple local training records obtaining multiple local mapped training records according to the input format, training the local machine learning model on the multiple local mapped training records, obtaining a locally trained parameter set, sending the locally trained parameter set to the federation server for distribution among multiple federated machine learning clients.

3. A federated machine learning method according to claim 2, wherein the locally trained machine learning model is trained on a first federated machine learning client from multiple training records local to the first federated machine learning client, and wherein the one or more received machine learning models have been trained on further federated machine learning clients from further multiple training records local to the further federated machine learning clients.

4. A federated machine learning method according to claim 2, wherein the multiple local training records are partially scrambled before training the local machine learning model on the multiple local mapped training records.

5. A federated machine learning method according to claim 1, wherein a received trained parameter set represents an aggregation of at least two machine learning models, wherein said at least two machine learning models have been trained on further federated machine learning clients from further multiple training records local to the further federated machine learning clients.

6. A federated machine learning method according to claim 5, wherein
the locally trained machine learning model is applied to the mapped record, and/or
the locally trained machine learning model is applied to the record before mapping the record to the mapped record.

7. A federated machine learning method according to claim 1, wherein combining the multiple model results into a combined model result comprises:
weighted or unweighted averaging of at least the multiple model results, and/or
majority voting among at least the multiple model results.

8. A federated machine learning method according to claim 1, wherein the multiple local training records are not sent to the federation server.

9. A federated machine learning method according to claim 1, comprising:
receiving from the federation server an update to a previously stored trained parameter set, and updating the previously stored trained parameter set, and/or
training an updated local machine learning model and sending an update to the locally trained parameter set to the federation server, the update comprising a difference between a current locally trained parameter set and a previously sent locally trained parameter set.

10. A federated machine learning method according to claim 1, wherein a discrete feature is extended by retrieving one or more continuous features for the first feature.

11. A federation client, comprising:
a communication interface configured for:
receiving one or more trained parameter sets representing one or more machine learning models, the machine learning models having the same input format, and one or more processors to execute instructions to:
obtain a record from a local database for running inference on, the record comprising multiple data features according to a local format, different from the input format,
for at least one data feature of the multiple data features, apply a data mapping rule to obtain a mapped record according to the input format, wherein the application of the mapping rule:
generalizes the data feature by mapping a first range of the data feature to a second reduced range, and/or extend the number of data features by mapping the data feature to multiple extended features,
applies the one or more machine learning models to the mapped record and to trained machine learning model to obtain multiple model results, and
combines the multiple model results into a combined model result;
wherein two data features of the multiple data features represent locations, extending the number of data features comprising computing a distance between said two locations, and including the distance in the multiple extended features.

12. A federation client according to claim 11, the processor configured for:
applying a selection criterion to a local database obtaining multiple local training records selected from the local database, the training records being according to the local format,
applying the mapping rule to at least one data feature of the multiple local training records obtaining multiple local mapped training records according to the input format,
training the local machine learning model on the multiple local mapped training records, obtaining a locally trained parameter set,
sending the locally trained parameter set to the federation server for distribution among multiple federated machine learning clients.

13. A federation client according to claim 12, wherein the locally trained machine learning model is trained on a first federated machine learning client from multiple training records local to the first federated machine learning client, and wherein the one or more received machine learning models have been trained on further federated machine learning clients from further multiple training records local to the further federated machine learning clients.

14. A federation client according to claim 11, wherein a received trained parameter set represents an aggregation of at least two machine learning models, wherein said at least two machine learning models have been trained on further federated machine learning clients from further multiple training records local to the further federated machine learning clients.

15. A federation client according to claim 14, wherein
the locally trained machine learning model is applied to the mapped record, and/or
the locally trained machine learning model is applied to the record before mapping the record to the mapped record.

16. A federation client according to claim 11, wherein combining the multiple model results into a combined model result comprises:
weighted or unweighted averaging of at least the multiple model results, and/or
majority voting among at least the multiple model results.

17. A federated machine learning method according to claim 11, the processor configured for:
receiving from the federation server an update to a previously stored trained parameter set, and updating the previously stored trained parameter set, and/or
training an updated local machine learning model and sending an update to the locally trained parameter set to the federation server, the update comprising a difference between a current locally trained parameter set and a previously sent locally trained parameter set.

* * * * *